US012437683B2

(12) United States Patent
Jung

(10) Patent No.: US 12,437,683 B2
(45) Date of Patent: Oct. 7, 2025

(54) DISPLAY DEVICE INCLUDING A VOLTAGE GENERATOR

(71) Applicant: Samsung Display Co., Ltd., Yongin-Si (KR)

(72) Inventor: Hayong Jung, Yongin-si (KR)

(73) Assignee: Samsung Display Co., Ltd., Yongin-Si (KR)

(*) Notice: Subject to any disclaimer, the term of this patent is extended or adjusted under 35 U.S.C. 154(b) by 126 days.

(21) Appl. No.: 18/237,917

(22) Filed: Aug. 25, 2023

(65) Prior Publication Data

US 2024/0169869 A1 May 23, 2024

(30) Foreign Application Priority Data

Nov. 22, 2022 (KR) ........................ 10-2022-0157692

(51) Int. Cl.
*G09G 3/00* (2006.01)
*G09G 3/3233* (2016.01)

(52) U.S. Cl.
CPC ........... *G09G 3/006* (2013.01); *G09G 3/3233* (2013.01); *G09G 2300/0819* (2013.01); *G09G 2300/0842* (2013.01); *G09G 2320/045* (2013.01); *G09G 2320/048* (2013.01); *G09G 2330/028* (2013.01); *G09G 2330/12* (2013.01)

(58) Field of Classification Search
CPC .... G09G 3/30–3291; G09G 2300/0842–0852; G09G 2300/0876; G09G 2310/0243–0259; G09G 2310/06–066; G09G 2310/08; G09G 2320/0223; G09G 2320/0233; G09G 2320/04–048; G09G 3/006; G09G 3/3233; G09G 2300/0819; G09G 2320/045; G09G 2330/028; G09G 2330/12
See application file for complete search history.

(56) References Cited

U.S. PATENT DOCUMENTS

| | | | |
|---|---|---|---|
| 9,330,605 | B2 | 5/2016 | Park |
| 9,659,528 | B2 | 5/2017 | Kim |
| 9,926,896 | B2 | 3/2018 | Nakashima et al. |
| 9,927,865 | B2 | 3/2018 | Heo et al. |
| 10,430,918 | B2 | 10/2019 | Kim et al. |
| 10,467,951 | B2 | 11/2019 | Bae et al. |
| 10,783,827 | B2 | 9/2020 | Shin et al. |

(Continued)

FOREIGN PATENT DOCUMENTS

| | | | |
|---|---|---|---|
| EP | 2876634 | B1 | 10/2018 |
| KR | 10-2018-0032706 | A | 4/2018 |

(Continued)

*Primary Examiner* — Roberto W Flores
(74) *Attorney, Agent, or Firm* — Innovation Counsel LLP

(57) ABSTRACT

Disclosed is a display device including a display panel, a sensing driver, and a voltage generator. The display panel includes a sensing line, a pixel connected to the sensing line, and a first driving voltage line connected to the pixel. The pixel includes a light emitting element connected between the sensing line and the first driving voltage line. The sensing driver senses a sensing voltage through the sensing line during a sensing period. The voltage generator supplies a first driving voltage to the first driving voltage line. During the sensing period, the voltage generator varies the first driving voltage over time based on a change in the sensing voltage.

18 Claims, 19 Drawing Sheets

(56) References Cited

U.S. PATENT DOCUMENTS

| | | | | |
|---|---|---|---|---|
| 11,417,284 | B2 | 8/2022 | Kim et al. | |
| 2015/0187278 | A1 | 7/2015 | Park | |
| 2020/0051500 | A1* | 2/2020 | Lin | G09G 3/3225 |
| 2020/0184902 | A1* | 6/2020 | Kim | G09G 3/3291 |
| 2021/0174742 | A1* | 6/2021 | Hwang | G09G 3/3233 |
| 2021/0201718 | A1* | 7/2021 | Ha | G09G 3/006 |

FOREIGN PATENT DOCUMENTS

| | | | |
|---|---|---|---|
| KR | 10-2075920 | B1 | 2/2020 |
| KR | 10-2166063 | B1 | 10/2020 |

* cited by examiner

<ta>

<tb>

<tc>

<ta>

<tb>

<tc>

<ta>

<tb>

<tc>

DISPLAY DEVICE INCLUDING A VOLTAGE GENERATOR

CROSS-REFERENCE TO RELATED APPLICATIONS

This application claims priority under 35 U.S.C. § 119 to Korean Patent Application No. 10-2022-0157692 filed on Nov. 22, 2022, in the Korean Intellectual Property Office, the disclosures of which are incorporated by reference herein in their entireties.

BACKGROUND

The present disclosure relates to a display device, and more particularly, relates to a display device capable of improving display quality.

A light emitting display device displays an image by using a light emitting diode that generates light through the recombination of electrons and holes. Light emitting display devices are driven with a low power while providing a fast response speed.

A light emitting display device includes pixels connected to data lines and scan lines. In general, each of the pixels includes a light emitting element and a pixel circuit unit for controlling the amount of current flowing to the light emitting element. In response to a data signal, the pixel circuit unit may control the amount of current that flows from a terminal, to which a first driving voltage is applied, to a terminal, to which a second driving voltage is applied, via the light emitting element. In this case, a light having predetermined luminance is generated to correspond to the amount of current flowing through the light emitting element.

SUMMARY

Embodiments of the present disclosure may provide a display device for improving display quality by accurately sensing and compensating for driving characteristics of each pixel.

According to an embodiment, a display device includes a display panel, a sensing driver, and a voltage generator. The display panel includes a sensing line, a pixel connected to the sensing line, and a first driving voltage line connected to the pixel. The pixel includes a light emitting element connected between the sensing line and the first driving voltage line. The sensing driver senses a sensing voltage through the sensing line during a sensing period. The voltage generator supplies a first driving voltage to the first driving voltage line. During the sensing period, the voltage generator varies the first driving voltage over time based on a change in the sensing voltage.

According to an embodiment, a display device includes a display panel, at least one driver chip, and a voltage generator. The display panel includes a plurality of sensing lines, a plurality of pixels connected to each of the sensing lines, and a first driving voltage line connected to the plurality of pixels. Each of the pixels includes a light emitting element connected between a corresponding sensing line and the first driving voltage line. The at least one driver chip connected to the plurality of pixels to drive the plurality of pixels and to sense sensing voltages through the plurality of sensing lines during a sensing period. The voltage generator supplies a first driving voltage to the first driving voltage line. During the sensing period, the voltage generator varies the first driving voltage applied to the first driving voltage line over time based on a change in a sensing voltage of the corresponding sensing line among the sensing voltages.

According to an embodiment, a display device includes a display panel, at least one driver chip, and a voltage generator. The display panel includes a plurality of sensing line, a plurality of line capacitors respectively connected to the plurality of sensing lines, a plurality of pixels connected to each of the sensing lines, and a first driving voltage line connected to the plurality of pixels. Each of the pixels includes a light emitting element connected between a corresponding sensing line and the first driving voltage line. The at least one driver chip connected to the plurality of pixels to drive the plurality of pixels and to sense sensing voltages through the plurality of sensing lines during a sensing period. The voltage generator supplies a first driving voltage to the first driving voltage line.

The first driving voltage line includes a plurality of sub-voltage lines provided to the display panel and isolated from one another. A plurality of sub-driving voltages are respectively applied to the plurality of sub-voltage lines.

During the sensing period, the voltage generator varies each of the plurality of sub-driving voltages over time based on a deviation between the plurality of line capacitors.

BRIEF DESCRIPTION OF THE FIGURES

The above and other objects and features of the present disclosure will become apparent by describing in detail embodiments thereof with reference to the accompanying drawings.

DETAILED DESCRIPTION

Figure 1:
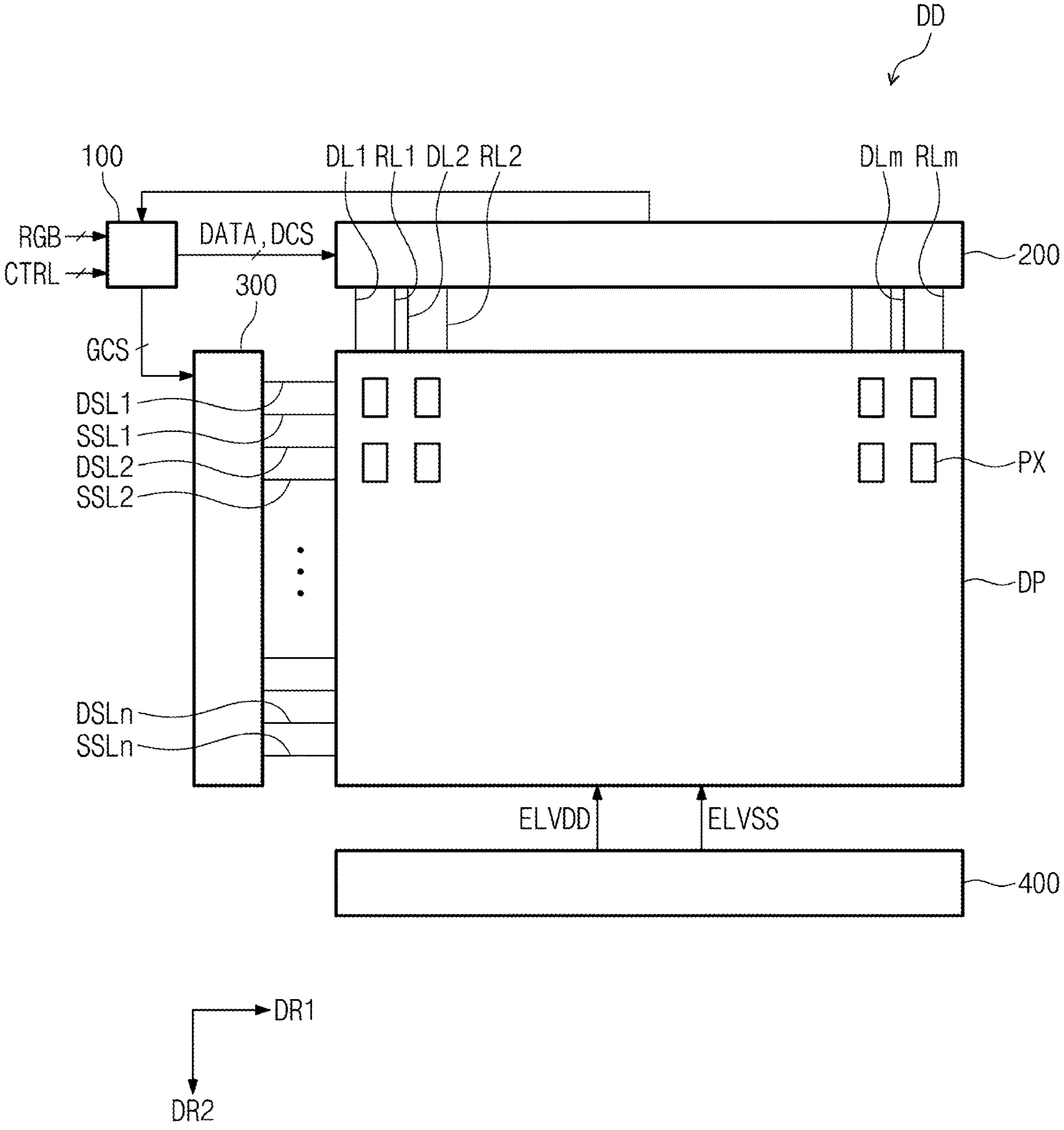
FIG. 1 is a block diagram of a display device according to an embodiment of the present disclosure.

In the specification, the expression that a first component (or region, layer, part, portion, etc.) is "on", "connected with", or "coupled with" a second component means that the first component is directly on, connected with, or coupled with the second component or means that a third component is interposed therebetween.

The same reference numerals refer to the same components. Also, in drawings, the thickness, ratio, and dimension of components are exaggerated for effectiveness of description of technical contents.

Although the terms "first", "second", etc. may be used to describe various components, the components should not be construed as being limited by the terms. The terms are only used to distinguish one component from another component. For example, without departing from the scope and spirit of the present disclosure, a first component may be referred to as a second component, and similarly, the second component may be referred to as the first component. The articles "a," "an," and "the (sometimes)" are singular in that they have a single referent, but the use of the singular form in the specification should not preclude the presence of more than one referent.

Also, the terms "under", "below", "on", "above", etc. are used to describe the correlation of components illustrated in drawings. The terms that are relative in concept are described based on a direction shown in drawings.

It will be understood that the terms "include", "comprise", "have", etc. specify the presence of features, numbers, steps, operations, elements, or components, described in the specification, or a combination thereof, not precluding the presence or additional possibility of one or more other features, numbers, steps, operations, elements, or components or a combination thereof.

Unless otherwise defined, all terms (including technical terms and scientific terms) used in the specification have the same meaning as commonly understood by one skilled in the art to which the present disclosure belongs. Furthermore, terms such as terms defined in the dictionaries commonly used should be interpreted as having a meaning consistent with the meaning in the context of the related technology, and should not be interpreted in ideal or overly formal meanings unless explicitly defined herein.

Hereinafter, embodiments of the present disclosure will be described with reference to accompanying drawings.

Figure 2:
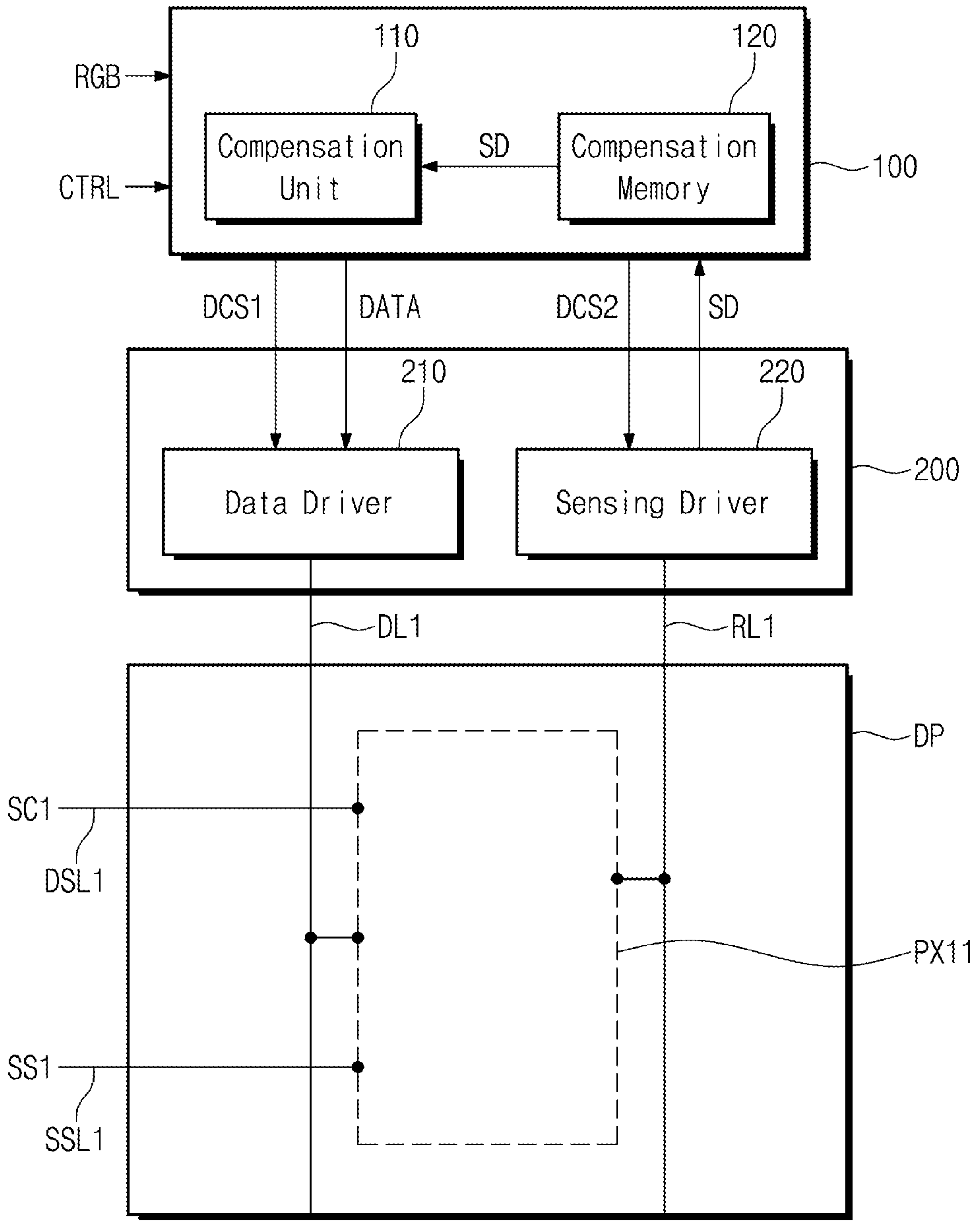
FIG. 2 is a block diagram showing a controller and a source driver shown in FIG. 1.

FIG. 1 is a block diagram of a display device, according to an embodiment of the present disclosure. FIG. 2 is a block diagram showing a controller and a source driver shown in FIG. 1.

Referring to FIGS. 1 and 2, a display device DD according to an embodiment of the present disclosure may be a device that is activated in response to an electrical signal and then displays an image. The display device DD may be applied to an electronic device such as a smart watch, a tablet PC, a notebook computer, a computer, a smart television, or the like.

The display device DD may include a display panel DP, a controller 100, a source driver 200, a scan driver 300, and a voltage generator 400. As an example of the present disclosure, the source driver 200 may include a data driver 210 and a sensing driver 220.

The display panel DP includes a plurality of driving scan lines DSL1 to DSLn, a plurality of sensing scan lines SSL1 to SSLn, a plurality of data lines DL1 to DLm, a plurality of sensing lines RL1 to RLm, and a plurality of pixels PX. The driving scan lines DSL1 to DSLn may extend in a first direction DR1 and may be arranged in the second direction DR2. The sensing scan lines SSL1 to SSLn may extend in the first direction DR1 and may be arranged in the second direction DR2. The second direction DR2 may be a direction intersecting the first direction DR1. The data lines DL1 to DLm may extend in the second direction DR2 and may be arranged in the first direction DR1. The sensing lines RL1 to RLm may extend in the second direction DR2 and may be arranged in the first direction DR1.

The plurality of pixels PX may be electrically connected to the driving scan lines DSL1 to DSLn, the sensing scan lines SSL1 to SSLn, the data lines DL1 to DLm, and the sensing lines RL1 to RLm. Each of the plurality of pixels PX may be electrically connected with two scan lines. For example, as shown in FIG. 2, a first pixel PX11 among the plurality of pixels PX may be connected to a first driving scan line DSL1, a first sensing scan line SSL1, a first data line DL1, and a first sensing line RL1. However, the number of scan lines connected to each pixel is not limited thereto. For example, each pixel may be electrically connected to one or three scan lines.

Each of the plurality of pixels PX may include a light emitting element ED (see FIG. 4) and a pixel circuit unit PXC (see FIG. 4) for controlling the emission of the light emitting element ED. The pixel circuit unit PXC may include a plurality of transistors and at least one capacitor.

The controller 100 receives an image signal RGB and a control signal CTRL. The controller 100 generates image data DATA by converting a data format of the image signal RGB in compliance with the specification for an interface with the source driver 200. The controller 100 outputs a scan control signal GCS and a source control signal DCS. The source control signal DCS may include a data control signal DCS1 for controlling driving of the data driver 210 and a sensing control signal DCS2 for controlling driving of the sensing driver 220.

The data driver 210 receives the data control signal DCS1 and the image data DATA from the controller 100. The data driver 210 converts the image data DATA into data signals (or data voltages) and outputs the data signals to the plurality of data lines DL1 to DLm. The data signals may be analog voltages corresponding to grayscale values of the image data DATA.

The sensing driver 220 receives the sensing control signal DCS2 from the controller 100. The sensing driver 220 may sense the display panel DP in response to the sensing control signal DCS2. The sensing driver 220 may sense characteristics of elements included in each of the pixels PX of the display panel DP from the plurality of sensing lines RL1 to RLm.

As an example of the present disclosure, the source driver 200 may be formed in a form of at least one chip. For example, when the source driver 200 is formed of a single chip, the data driver 210 and the sensing driver 220 may be embedded in the chip. Moreover, when the source driver 200 is formed of a plurality of chips, the data driver 210 and the sensing driver 220 may be embedded in each of the plurality of chips.

A structure in which the data driver 210 and the sensing driver 220 are embedded in the source driver 200 is illustrated as an example, but the present disclosure is not limited thereto. For example, the data driver 210 and the sensing driver 220 may be formed in a form of separate chips.

The controller 100 includes a compensation memory 120 for storing sensing data SD and a compensation unit 110 for compensating for the image data DATA based on the sensing data SD. The compensation memory 120 may receive and store the sensing data SD sensed through the sensing driver 220. The compensation unit 110 may read the sensing data SD stored in the compensation memory 120 and may compensate the image data DATA based on the sensing data SD.

In a time period (i.e., a power-on time period) when power is applied to the display device DD or in a time period (i.e., a power off time period) when a power supply is not applied, the controller 100 may drive the sensing driver 220. Alternatively, the controller 100 may drive the sensing driver 220 in a specific section (e.g., a blank section) where an image is not displayed among frames in each of which the display device DD displays an image.

Elements such as the light emitting element ED or transistors included in the pixels PX deteriorate in proportion to a driving time, and characteristics (e.g., a threshold voltage) thereof may reduce over the driving time. To compensate for this, the sensing driver 220 may sense characteristics of elements included in at least one pixel of the pixels PX and may feed the sensing data SD back to the controller 100. The controller 100 may compensate the image data DATA to be written in the pixels PX based on the sensing data SD fed back from the sensing driver 220.

The scan driver 300 receives the scan control signal GCS from the controller 100. The scan driver 300 may output scan signals in response to the scan control signal GCS. The scan driver 300 may be formed in a chip form to be mounted on the display panel DP. Alternatively, the scan driver 300 may be embedded in the display panel DP. When the scan driver 300 is embedded in the display panel DP, the scan driver 300 may include transistors formed through the same process as the pixel circuit unit PXC.

The scan driver 300 may generate a plurality of driving scan signals and a plurality of sensing scan signals in response to the scan control signal GCS. The plurality of driving scan signals are applied to the driving scan lines DSL1 to DSLn. The plurality of sensing scan signals are applied to the sensing scan lines SSL1 to SSLn.

Each of the plurality of pixels PX may receive a first driving voltage ELVSS and a second driving voltage ELVDD.

The voltage generator 400 generates voltages necessary to operate the display panel DP. In an embodiment of the present disclosure, the voltage generator 400 generates the first driving voltage ELVSS and the second driving voltage ELVDD, which are necessary for the operation of the display panel DP. The first driving voltage ELVSS and the second driving voltage ELVDD may be provided to the display panel DP through a first driving voltage line VL1 and a second driving voltage line VL2, respectively (see FIG. 4).

As well as the first driving voltage ELVSS and the second driving voltage ELVDD, the voltage generator 400 may further generate various voltages (e.g., a gamma reference voltage, a data driving voltage, a gate-on voltage, and a gate-off voltage) necessary for operations of the source driver 200 and the scan driver 300.

Figure 3:
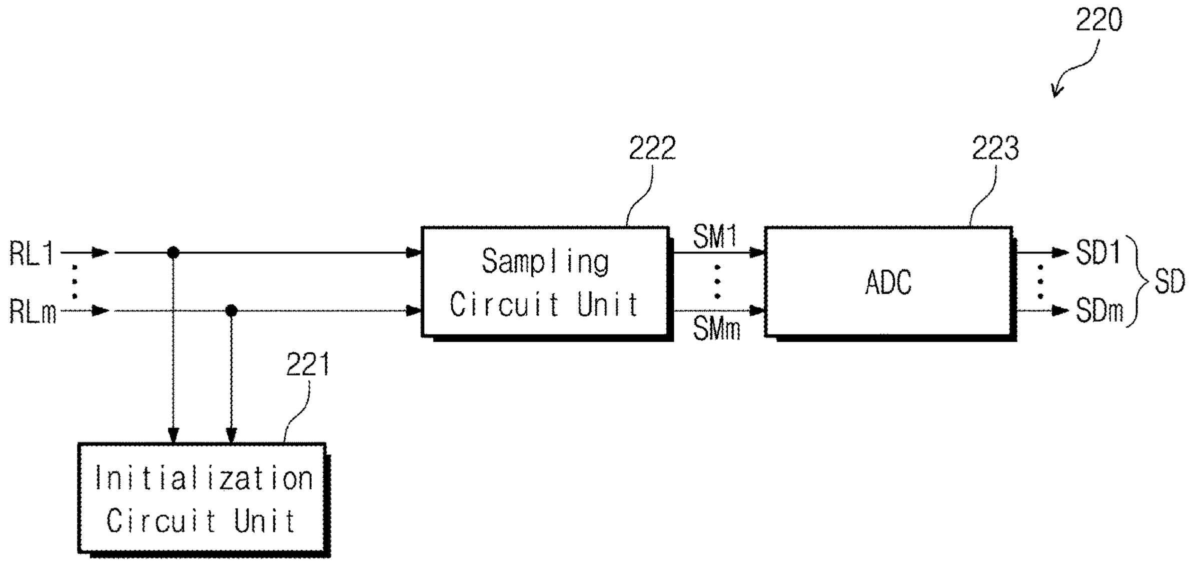
FIG. 3 is a block diagram of the sensing driver shown in FIG. 2.
Figure 4:
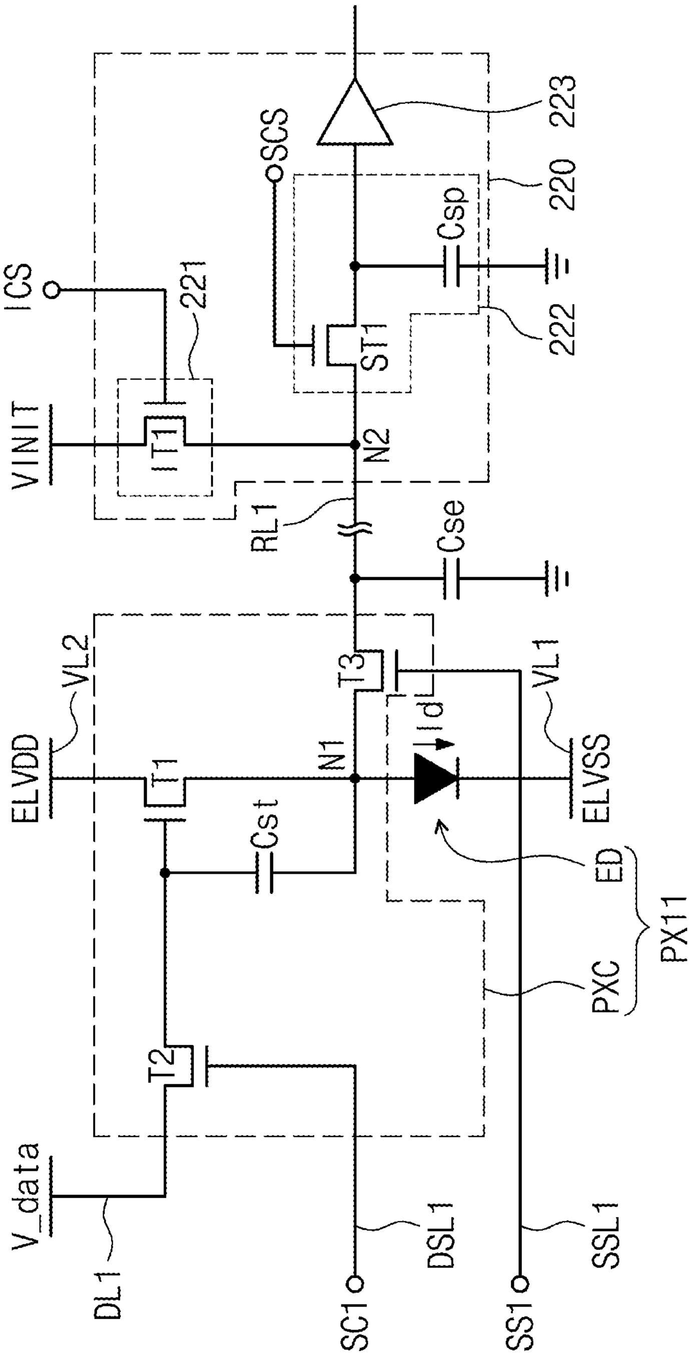
FIG. 4 is a circuit diagram illustrating a pixel and a sensing driver, according to an embodiment of the present disclosure.

FIG. 3 is a block diagram of the sensing driver shown in FIG. 2. FIG. 4 is a circuit diagram illustrating a pixel and a sensing driver, according to an embodiment of the present disclosure. FIG. 4 shows an equivalent circuit diagram of a first pixel PX11 among the plurality of pixels PX shown in FIG. 1. Because each of the plurality of pixels PX has the same circuit structure, a detailed description of the remaining pixels will be replaced with a description of a circuit structure of the first pixel PX11.

Referring to FIGS. 3 and 4, the sensing driver 220 according to an embodiment of the present disclosure may include an initialization circuit unit 221, a sampling circuit unit 222, and an analog-to-digital converter (hereinafter referred to as "ADC") 223.

The initialization circuit unit 221 may be electrically connected to the sensing lines RL1 to RLm to initialize the sensing lines RL1 to RLm in response to an initialization control signal ICS. The sampling circuit unit 222 may be electrically connected to the sensing lines RL1 to RLm to sample sensing signals (or sensing voltages) respectively output from the sensing lines RL1 to RLm in response to a sampling control signal SCS. During a sampling period, the sampling circuit unit 222 may sample sensing signals output from the sensing lines RL1 to RLm to output the sampling signals SM1 to SMm. The ADC 223 converts the sampling signals SM1 to SMm output from the sampling circuit unit 222 into sensing data SD1 to SDm in a digital format and outputs the sensing data SD1 to SDm.

Alternatively, the sensing driver 220 may further include a scaler positioned between the sampling circuit unit 222 and the ADC 223. The scaler may scale a voltage range of the sampling signals SM1 to SMm output from the sampling circuit unit 222 depending on an input voltage range of the ADC 223.

Referring to FIG. 4, the first pixel PX11 is connected to the first data line DL1, the first driving scan line DSL1, the first sensing scan line SSL1, and the first sensing line RL1.

The first pixel PX11 includes the light emitting element ED and the pixel circuit unit PXC. The light emitting element ED may be a light emitting diode. As an example of the present disclosure, the light emitting element ED may be an organic light emitting diode including an organic light emitting layer.

The pixel circuit unit PXC includes first to third transistors T1, T2, and T3 and a capacitor Cst. At least one of the first to third transistors T1, T2, and T3 may be a transistor having a low-temperature polycrystalline silicon (LTPS) semiconductor layer. Each of the first to third transistors T1, T2, and T3 may be an N-type transistor. However, the present disclosure is not limited thereto. Each of the first to third transistors T1, T2, and T3 may be a P-type transistor. Alternatively, some of the first to third transistors T1, T2, and T3 may be N-type transistors, and the other(s) thereof may be P-type transistors. Furthermore, at least one of the first to third transistors T1, T2, and T3 may be a transistor having an oxide semiconductor layer.

A configuration of the pixel circuit unit PXC according to the present disclosure is not limited to the embodiment illustrated in FIG. 4. The pixel circuit unit PXC illustrated in FIG. 4 is only one example, and the configuration of the pixel circuit unit PXC may be modified and carried out. For example, in the pixel circuit unit PXC, the third transistor T3 may be omitted.

The first transistor T1 is connected between the light emitting element ED and the second driving voltage line VL2 receiving the second driving voltage ELVDD. The first transistor T1 includes a first electrode (a source or drain electrode) connected to the second driving voltage line VL2, a second electrode (a drain or source electrode) electrically connected to an anode of the light emitting element ED, and a third electrode (a gate electrode) connected to one end of the capacitor Cst. Here, a contact point where the anode of the light emitting element ED is connected to the second electrode of the first transistor T1 may be referred to as a "first node N1". In this specification, "a transistor is connected to a signal line" means that one of a first electrode, a second electrode, and a third electrode of the transistor is integrated with a signal line or is connected through a connection electrode. Also, "a transistor is electrically connected to another transistor" means that one of a first electrode, a second electrode, and a third electrode of the transistor is integrated with one of a first electrode, a second electrode, and a third electrode of the other transistor, or is connected through a connection electrode".

The first transistor T1 may receive a data voltage V data transmitted through the first data line DL1 depending on the switching operation of the second transistor T2 and then may supply a driving current Id to the light emitting element ED.

The second transistor T2 is connected between the first data line DL1 and the third electrode of the first transistor T1. The second transistor T2 includes a first electrode (a source or drain electrode) connected to the first data line DL1, a second electrode (a drain or source electrode) connected to a third electrode of the first transistor T1, and a third electrode (a gate electrode) connected to the first driving scan line DSL1. The second transistor T2 is turned on in response to a first driving scan signal SC1 received through the first driving scan line DSL1 and may supply the data voltage V data transmitted from the first data line DL1 to the third electrode of the first transistor T1.

The third transistor T3 is connected between the second electrode of the first transistor T1 and a first sensing line RL1. The third transistor T3 includes a first electrode (a source or drain electrode) connected to the first node N1, a second electrode (a drain or source electrode) connected to the first sensing line RL1, and a third electrode (a gate electrode) connected to the first sensing scan line SSL1. The third transistor T3 is turned on in response to the first sensing scan signal SS1 received through the first sensing scan line SSL1 so as to electrically connect the first sensing line RL1 and the first node N1.

One end of the capacitor Cst is connected to the third electrode of the first transistor T1, and the other end of the capacitor Cst is connected to the first node N1. The cathode of the light emitting element ED may be connected to the first driving voltage line VL1, through which the first driving voltage ELVSS is transmitted. A voltage level of the first driving voltage ELVSS may be lower than a voltage level of the second driving voltage ELVDD.

The sensing driver 220 may be connected to the plurality of sensing lines RL1 to RLm. The sensing driver 220 may receive sensing voltages from the plurality of sensing lines RL1 to RLm. The initialization circuit unit 221 shown in FIG. 4 may include a plurality of initialization transistors respectively connected to the plurality of sensing lines RL1 to RLm. FIG. 4 shows only an initialization transistor IT1 connected to the first sensing line RL1. However, the initialization circuit unit 221 may further include initialization transistors respectively connected to the remaining sensing lines RL2 to RLm shown in FIG. 1.

The initialization transistor IT1 may include a first electrode (a source or drain electrode) receiving an initialization voltage VINIT, a second electrode (a drain or source electrode) connected to the first sensing line RL1, and a third electrode (a gate electrode) receiving an initialization control signal ICS. Here, a contact point where the first sensing line RL1 is connected to the initialization transistor IT1 may be referred to as a "second node N2". The initialization transistor IT1 may initialize a potential of the first sensing line RL1 to the initialization voltage VINIT in response to the initialization control signal ICS. As an example of the present disclosure, the initialization voltage VINIT may be a ground voltage.

The sampling circuit unit 222 shown in FIG. 4 may include a plurality of sampling transistors respectively connected to the plurality of sensing lines RL1 to RLm. FIG. 4 shows only a sampling transistor ST1 connected to the first sensing line RL1. However, the sampling circuit unit 222 may further include sampling transistors respectively connected to the remaining sensing lines RL2 to RLm shown in FIG. 1.

The sampling transistor ST1 includes a first electrode (a source or drain electrode) connected to the second node N2, a second electrode (a drain or source electrode) connected to the ADC 223, and a third electrode (a gate electrode) receiving the sampling control signal SCS. Here, the sampling transistor ST1 may receive a sensing voltage output from the first sensing line RL1 in response to the sampling control signal SCS. The sampling circuit unit 222 may further include various circuit elements for sampling a sensing voltage in addition to the sampling transistor ST1. A sampling signal sampled through the sampling circuit unit 222 may be supplied to the ADC 223.

The sampling circuit unit 222 may further include a sampling capacitor Csp connected to the first sensing line RL1. One end of the sampling capacitor Csp may be connected to the second electrode of the sampling transistor ST1, and the other end of the sampling capacitor Csp may be grounded. The sampling capacitor Csp may store the signal sampled through the sampling transistor ST1. FIG. 4 shows only the sampling capacitor Csp connected to the first sensing line RL1. However, the sampling circuit unit 222 may further include sampling capacitors respectively connected to the remaining sensing lines RL2 to RLm shown in FIG. 1.

A line capacitor Cse may be connected to the first sensing line RL1. As an example of the present disclosure, one end of the line capacitor Cse may be connected to the second electrode of the third transistor T3, and the other end of the line capacitor Cse may be grounded. Alternatively, when the third transistor T3 is omitted, one end of the line capacitor Cse may be directly connected to the first node N1.

FIG. 4 shows some configurations of the initialization circuit unit 221 and the sampling circuit unit 222 shown in FIG. 3. However, the configurations of the initialization circuit unit 221 and the sampling circuit unit 222 are not limited thereto.

Figure 5A:
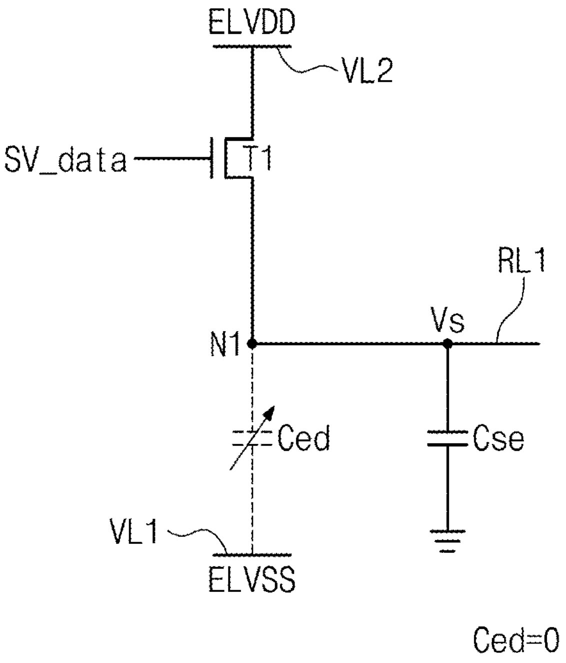
FIG. 5A is a circuit diagram for describing an operation of a sensing period, according to an embodiment of the present disclosure.
Figure 5B:
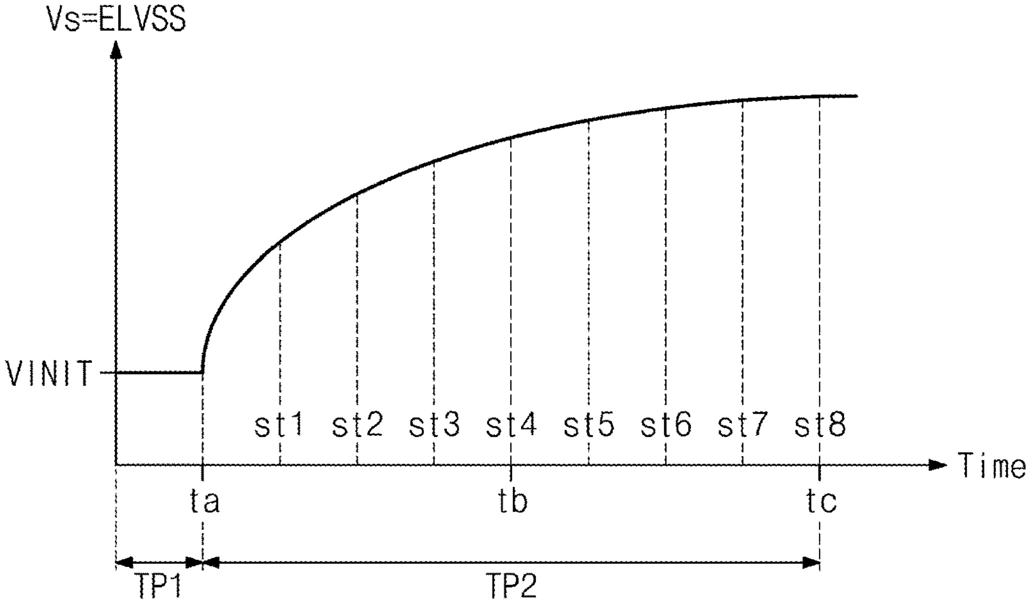
FIG. 5B is a waveform diagram illustrating changes in a sensing voltage and a first driving voltage shown in FIG. 5A during a sensing period.

FIG. 5A is a circuit diagram for describing an operation of a sensing period, according to an embodiment of the present disclosure. FIG. 5B is a waveform diagram illustrating changes in a sensing voltage and a first driving voltage shown in FIG. 5A during a sensing period.

Referring to FIGS. 4, 5A, and 5B, during a sensing period TP2, a sensing data voltage SV data may be applied to the third electrode (i.e., a gate electrode) of the first transistor T1. The sensing data voltage SV data may be a sensing data signal applied to the first data line DL1 through the data driver 210. The sensing data voltage SV data may be provided to the third electrode of the first transistor T1 through the second transistor T2 turned on in response to the first driving scan signal SC1.

During an initialization period TP1 before the sensing period TP2 starts, the first sensing line RL1 may be initialized by the initialization voltage VINIT.

The sensing period TP2 may start from a first time point to when the sensing data voltage SV_data is applied to the first transistor T1. The potential (i.e., the sensing voltage Vs) of the first sensing line RL1 may be varied from the first time point to by the sensing data voltage SV_data. During the sensing period TP2, the sensing voltage Vs may gradually rise, and at a second time point tc, the sensing voltage Vs may be saturated to a specific level.

During the sensing period TP2, the first driving voltage ELVSS may be varied over time based on a change in the sensing voltage Vs. As an example of the present disclosure, during the sensing period TP2, the first driving voltage ELVSS may be varied to have substantially the same voltage level as the sensing voltage Vs.

A light emitting capacitor Ced may be formed between the first node N1 and the first driving voltage line VL1 by the light emitting element ED (see FIG. 4). When the first driving voltage ELVSS varies over time based on the sensing voltage Vs during the sensing period TP2, the magnitude of the light emitting capacitor Ced may also be varied. In particular, when the first driving voltage ELVSS is varied to have substantially the same voltage level as the sensing voltage Vs during the sensing period TP2, the light emitting capacitor Ced may have substantially capacitance of 0.

When the first driving voltage ELVSS is maintained at a specific voltage level during the sensing period TP2, the capacitance of the light emitting capacitor Ced may vary as the sensing voltage Vs is varied. As the capacitance of the light emitting capacitor Ced increases, the influence of the light emitting capacitor Ced on the sensing voltage Vs is further increased. To reduce the influence of the light emitting capacitor Ced on the sensing voltage Vs, the light emitting capacitor Ced may be made to have substantially capacitance of 0 by varying a voltage level of the first driving voltage ELVSS over time based on a change in the sensing voltage Vs during the sensing period TP2. Accordingly, it is possible to accurately sense the sensing voltage Vs by minimizing the influence of the light emitting capacitor Ced. As a result, it is possible to compensate the sensing data voltage SV data by accurately reflecting driving characteristics (e.g., a threshold voltage of the first transistor T1, etc.) of each of the pixels PX.

Figure 6:
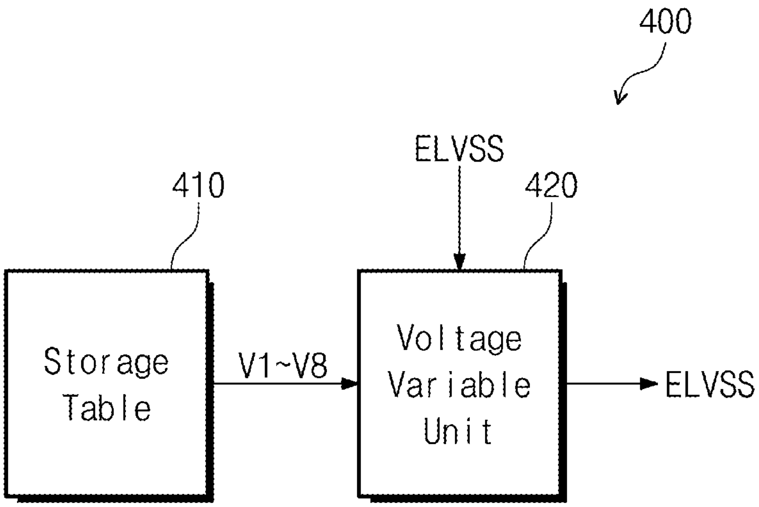
FIG. 6 is a block diagram of a voltage generator, according to an embodiment of the present disclosure.

FIG. 6 is a block diagram of a voltage generator, according to an embodiment of the present disclosure.

Referring to FIGS. 5B and 6, the voltage generator 400 may include a storage table 410 and a voltage variable unit 420. The storage table 410 may be a lookup table in which different voltage levels are stored depending on specific times elapsed from a start time point (i.e., the first time point ta) of the sensing period TP2. In particular, the different voltage levels may be stored in the storage table 410 depending on the specific times based on a change in the sensing voltage Vs. As an example of the present disclosure, it is indicated that voltage levels V1 to V8 at eight specific time points st1, st2, st3, st4, st5, st6, st7 and st8 spaced from the first time point ta are stored in the storage table 410. However, the number of the specific time points st1 to st8 and the number of voltage levels V1 to V8 for the specific time points st1 to st8, which are stored in the storage table 410, are not particularly limited thereto. For example, when the sensing period TP2 corresponds to several tens of milliseconds (ms), the specific time points may be set in units of hundreds of microseconds (μs).

The voltage variable unit 420 is activated at the first time point ta when the sensing period TP2 starts. The voltage variable unit 420 may read specific voltage levels V1 to V8 for specific time points st1 to st8 from the storage table 410. The voltage variable unit 420 may calculate voltage levels for fine time points by using an interpolation method based on the specific voltage levels V1 to V8. For example, the voltage variable unit 420 may calculate voltage levels for fine time points included in a period from the first time point ta to the first specific time point st1. The fine time points may be set in units of several tens of μs. In this case, the voltage variable unit 420 may change a voltage level of the first driving voltage ELVSS over time so as to match the sensing voltage Vs in units of fine time point. The size of the storage table 410 may be reduced by calculating voltage levels for fine time points in an interpolation method.

Figure 7:
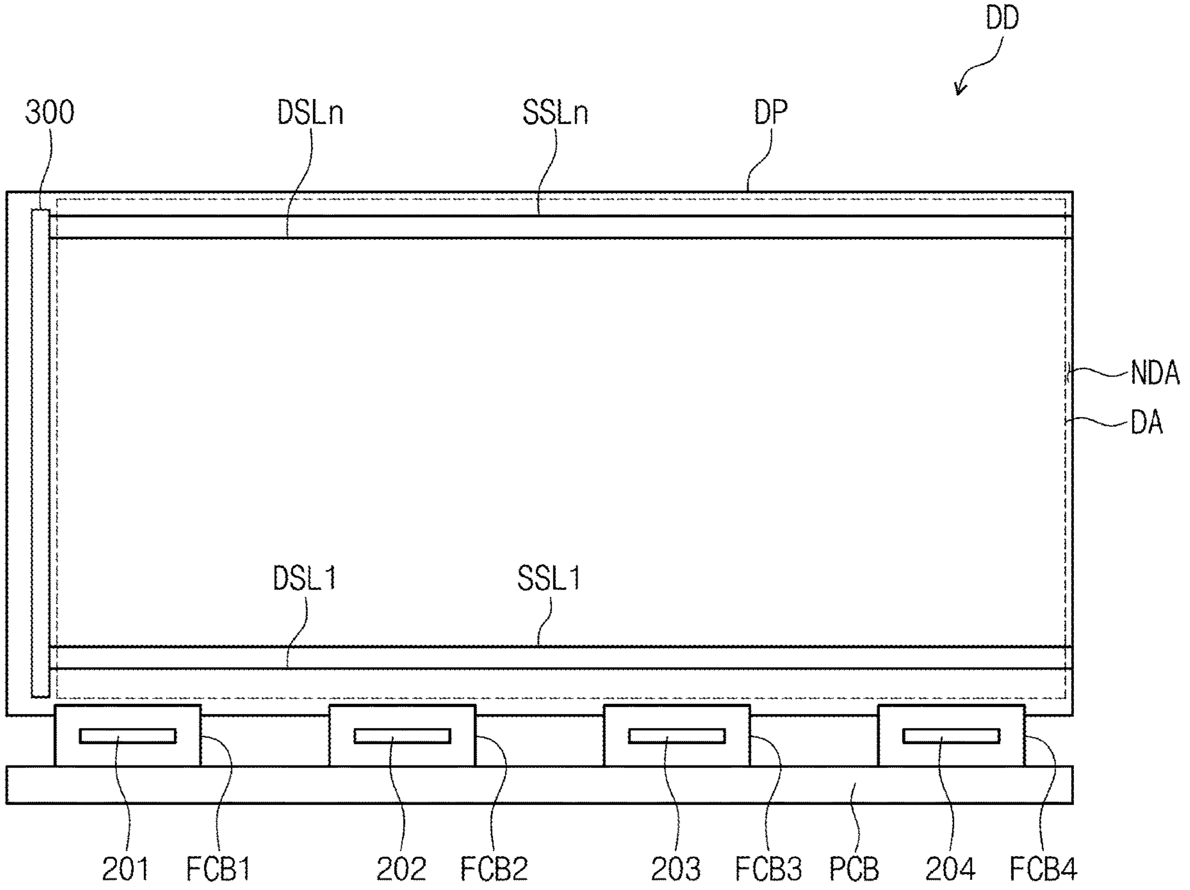
FIG. 7 is a plan view of a display device, according to an embodiment of the present disclosure.

FIG. 7 is a plan view of a display device, according to an embodiment of the present disclosure.

Referring to FIGS. 1 and 7, the display panel DP includes a display area DA for displaying an image and a non-display area NDA adjacent to the periphery of the display area DA. The display area DA is an area where an image is actually displayed, and the non-display area NDA is a bezel area in which an image is not displayed. FIG. 7 shows a structure in which the non-display area NDA is positioned to surround a display area DA, but the present disclosure is not limited thereto. The non-display area NDA may be positioned on only at least one side of the display area DA.

The plurality of driving scan lines DSL1 to DSLn and the plurality of sensing scan lines SSL1 to SSLn are disposed in the display area DA. The plurality of data lines DL1 to DLm, the plurality of sensing lines RL1 to RLm, and the plurality of pixels PX, which are shown in FIG. 1, are further disposed in the display area DA.

The source driver 200 may be formed in a form of a plurality of chips. In this case, the display device DD may include a plurality of driver chips 201, 202, 203, and 204 in each of which the source driver 200 is embedded. The data driver 210 (see FIG. 2) and the sensing driver 220 (see FIG. 2) may be disposed in each of the driver chips 201, 202, 203, and 204.

The display device DD may further include a plurality of flexible films FCB1, FCB2, FCB3, and FCB4 connected to the display panel DP. The driver chips 201, 202, 203, and 204 may be mounted on the flexible films FCB1, FCB2, FCB3, and FCB4, respectively. The flexible films FCB1, FCB2, FCB3, and FCB4 may be attached to a first side of the display panel DP.

The display device DD may further include at least one printed circuit board PCB coupled to the flexible films FCB1, FCB2, FCB3, and FCB4. As an example of the present disclosure, the one printed circuit board PCB is provided in the display device DD, but a plurality of printed circuit boards may be provided. Moreover, the controller 100 and the voltage generator 400 may be disposed on the printed circuit board PCB.

As an example of the present disclosure, a first side of the display panel DP may be a side adjacent to the first driving scan line DSL1 among the plurality of driving scan lines DSL1 to DSLn. A second side opposite to the first side of the display panel DP may be a side adjacent to the n-th driving scan line DSLn among the plurality of driving scan lines DSL1 to DSLn.

The flexible films FCB1, FCB2, FCB3, and FCB4 may be positioned to be adjacent to the first side or second side of the display panel DP.

The sensing driver 220 may be embedded in each of the driver chips 201, 202, 203, and 204. The driver chips 201, 202, 203, and 204 may be connected to the plurality of sensing lines RL1 to RLm. For example, some of the plurality of sensing lines RL1 to RLm may be connected to the first driver chip 201. The number of sensing lines connected to each of the driver chips 201, 202, 203, and 204 may be the same.

Figure 8A:
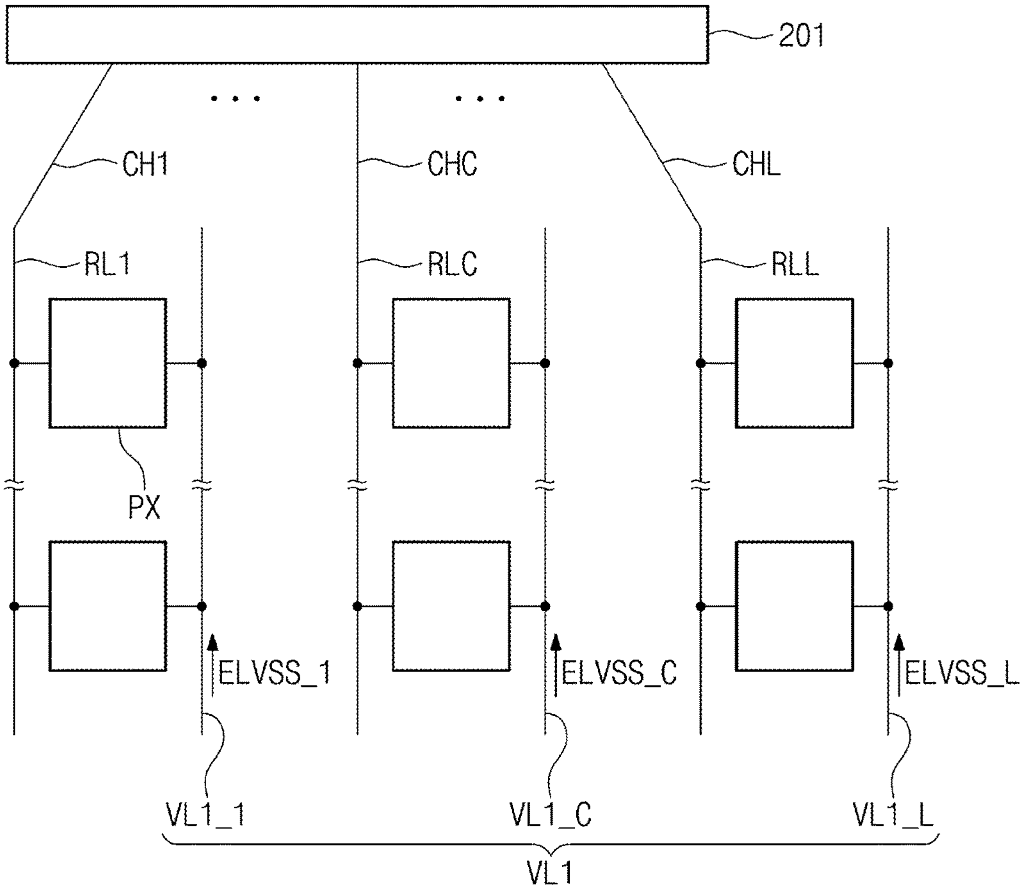
FIG. 8A is a diagram illustrating a connection relationship between a first driver chip, sensing lines, and sub-voltage lines shown in FIG. 7.
Figure 8B:
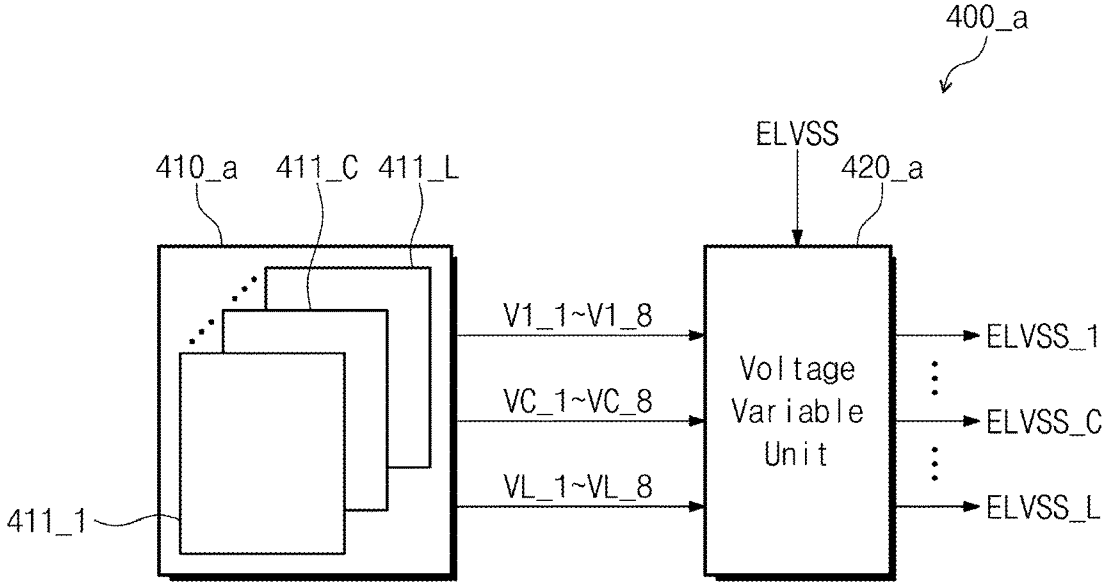
FIG. 8B is a block diagram of a voltage generator, according to an embodiment of the present disclosure.

FIG. 8A is a diagram illustrating a connection relationship between the first driver chip, sensing lines, and sub-voltage lines shown in FIG. 7. FIG. 8B is a block diagram of a voltage generator, according to an embodiment of the present disclosure. However, FIG. 8A shows the first driver chip 201 among the driver chips 201, 202, 203, and 204 shown in FIG. 7 and sensing lines connected to the first driver chip 201. The remaining driver chips 202, 203, and 204 may be connected to corresponding sensing lines in a similar manner.

Referring to FIG. 8A, the first driver chip 201 may include a plurality of channels CH1 to CHL to be connected to a corresponding plurality of sensing lines RL1 to RLL. The plurality of sensing lines RL1 to RLL may be some of the plurality of sensing lines RL1 to RLm shown in FIG. 1. FIG. 8A shows three sensing lines among the plurality of sensing lines RL1 to RLL for convenience of description. Hereinafter, three sensing lines are respectively referred to as a "first sensing line RL1", a "center sensing line RLC", and a "last sensing line RLL". The plurality of pixels PX may be connected to each of the first sensing line RL1, the center sensing line RLC, and the last sensing line RLL.

The plurality of channels CH1 to CHL may be respectively connected to the plurality of sensing lines RL1 to RLL. As an example of the present disclosure, the plurality of channels CH1 to CHL may be connected to the plurality of sensing lines RL1 to RLL at a one to one ratio. However, the present disclosure is not limited thereto. Each of the channels CH1 to CHL may be commonly connected to 'k' sensing lines. Here, 'k' is an integer that is not less than 1. For convenience of description, FIG. 8A illustrates three channels of the plurality of channels CH1 to CHL. Hereinafter, the three channels are respectively referred to as a "first channel CH1", a "center channel CHC", and a "last channel CHL".

As an example of the present disclosure, the first driving voltage line VL1 may include a plurality of sub-voltage lines VL1_1 to VL1_L. The plurality of sub-voltage lines VL1_1 to VL1_L may be positioned to correspond to the plurality of sensing lines RL1 to RLL, respectively. Each of the plurality of sub-voltage lines VL1_1 to VL1_L may be electrically connected to the pixels PX connected to a corresponding sensing line. For convenience of description, FIG. 8A illustrates three sub-voltage lines among the plurality of sub-voltage lines VL1_1 to VL1_L. Hereinafter, the three sub-voltage lines are respectively referred to as a "first sub-voltage line VL1_1", a "center sub-voltage line VL1_C", and a "last sub-voltage line VL1_L". The first sub-voltage line VL1_1, the center sub-voltage line VL1_C, and the last sub-voltage line VL1_L are isolated from one another.

Referring to FIGS. 8A and 8B, the first driving voltage ELVSS may be varied to a plurality of sub-driving voltages ELVSS_1 to ELVSS_L respectively applied to the plurality of sub-voltage lines VL1_1 to VL1_L.

A voltage generator 400_*a* may include a storage table 410_*a* and a voltage variable unit 420_*a*. The storage table 410_*a* may include a plurality of sub-storage tables 411_1 to 411_L. The plurality of sub-storage tables 411_1 to 411_L may be provided to correspond to the plurality of sub-voltage lines VL1_1 to VL1_L, respectively. Voltage levels according to time of the corresponding sub-driving voltages ELVSS_1 to ELVSS_L may be stored in the sub-storage table 411_1 to 411_L, respectively. The voltage variable unit 420_*a* may generate the sub-driving voltages ELVSS_1 to ELVSS_L to be applied to a corresponding sub-voltage line with reference to the corresponding sub-storage table 411_1 to 411_L.

To vary the first sub-driving voltage ELVSS_1, the voltage variable unit 420_*a* may read the specific voltage levels V1_1 to V1_8 for the specific time points st1 to st8 (see FIG. 5B) from the first sub-storage table 411_1. The voltage variable unit 420_*a* may vary the first sub-driving voltage ELVSS_1 in units of fine time point based on the specific voltage levels V1_1 to V1_8.

Furthermore, to vary the center sub-driving voltage ELVSS_C, the voltage variable unit 420_*a* may read specific voltage levels VC_1 to VC_8 for the specific time points st1 to st8 (see FIG. 5B) from the center sub-storage table 411_C. The voltage variable unit 420_*a* may vary the center sub-driving voltage ELVSS_C in units of the fine time point based on the specific voltage levels VC_1 to VC_8.

To vary the last sub-driving voltage ELVSS_L, the voltage variable unit 420_*a* may read specific voltage levels VL_1 to VL_8 for the specific time points st1 to st8 (see FIG. 5B) from the last sub-storage table 411_L. The voltage variable unit 420_*a* may vary the last sub-driving voltage ELVSS_L in units of the fine time point based on the specific voltage levels VL_1 to VL_8.

Figure 9A:
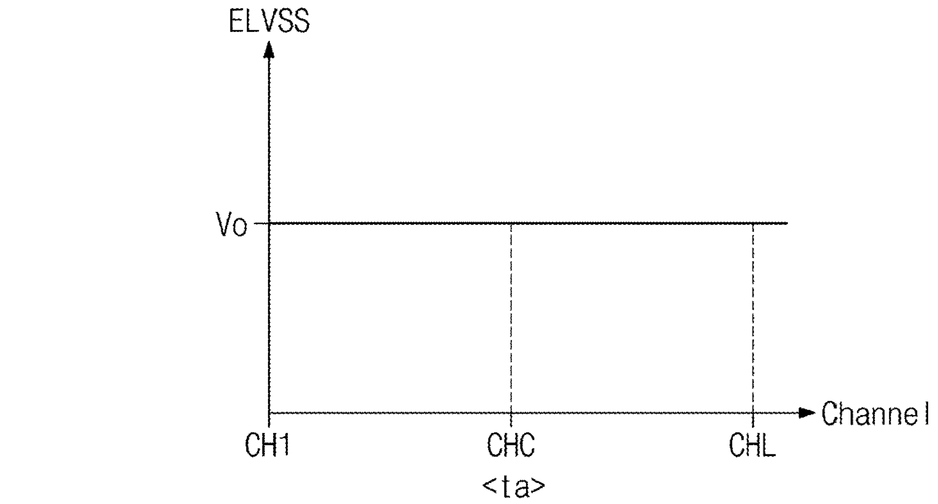
FIGS. 9A, 9B, and 9C are diagrams illustrating changes in channel-specific sub-driving voltages of a first driver chip, according to an embodiment of the present disclosure.
Figure 9B:
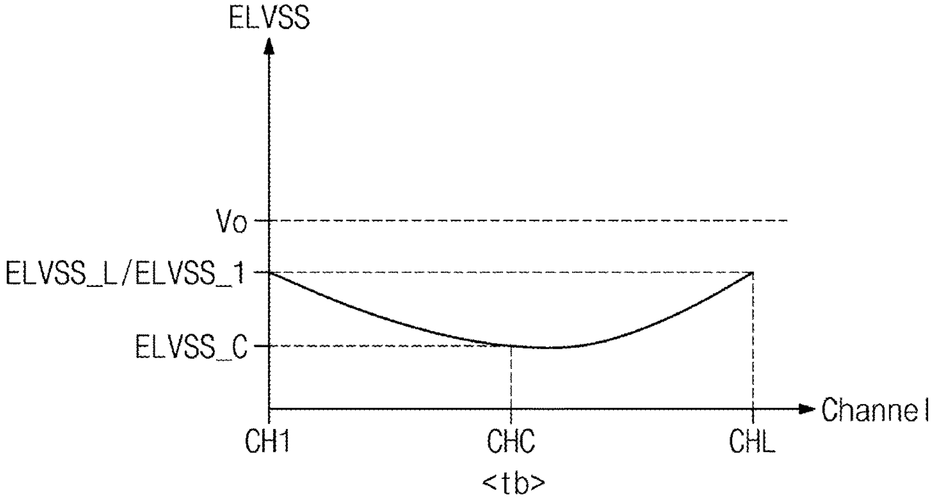
Figure 9C:
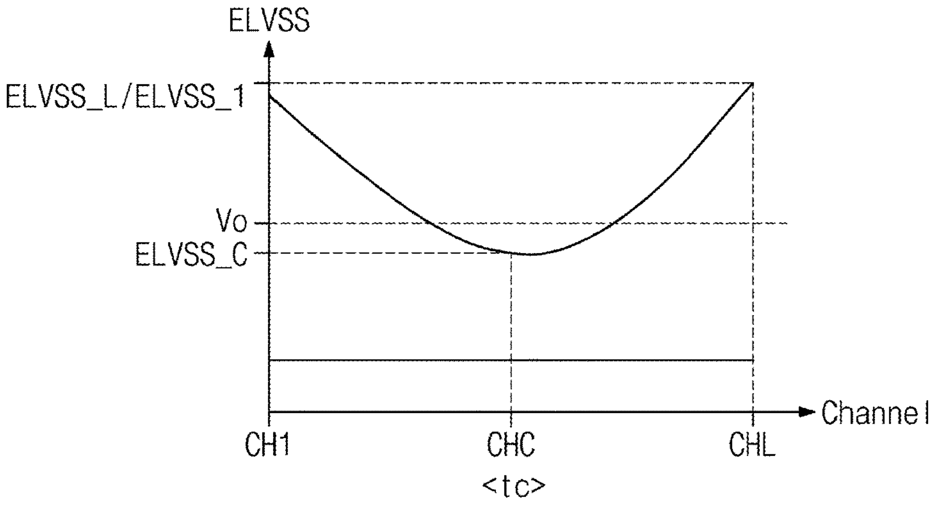
Figure 10A:
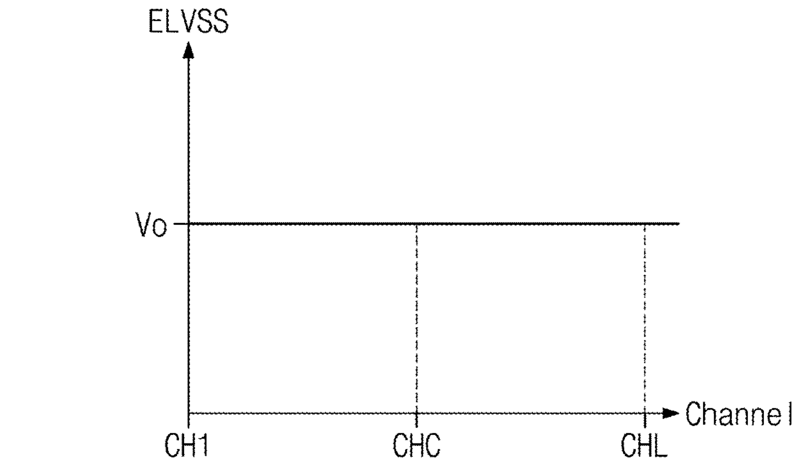
FIGS. 10A, 10B, and 10C are diagrams illustrating changes in channel-specific sub-driving voltages of a first driver chip, according to an embodiment of the present disclosure.
Figure 10B:
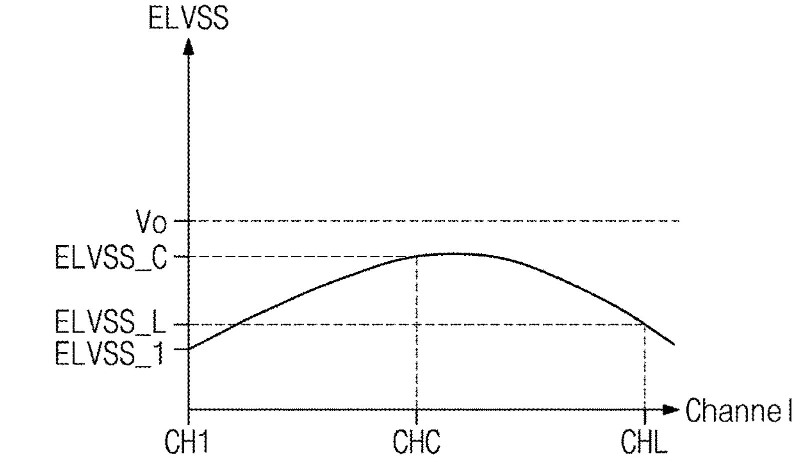
Figure 10C:
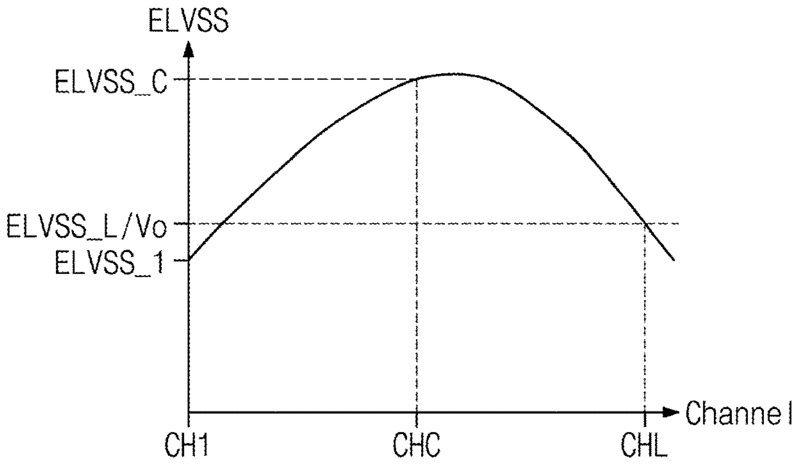
Figure 11A:
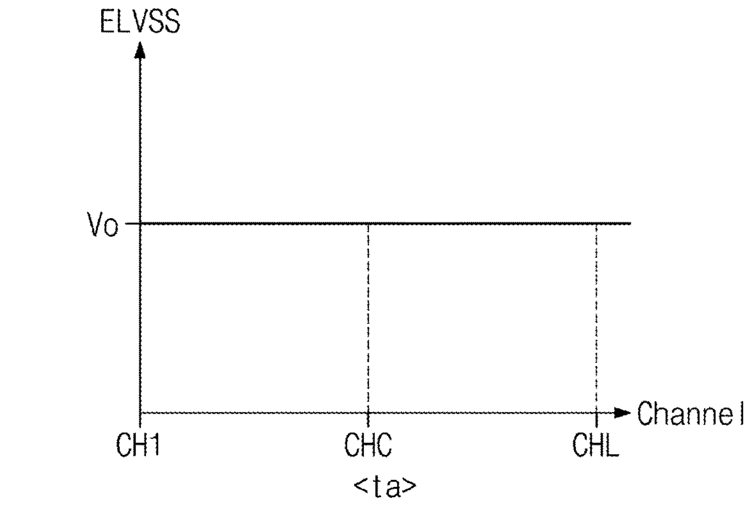
FIGS. 11A, 11B, and 11C are diagrams illustrating changes in channel-specific sub-driving voltages of a first driver chip, according to an embodiment of the present disclosure.
Figure 11B:
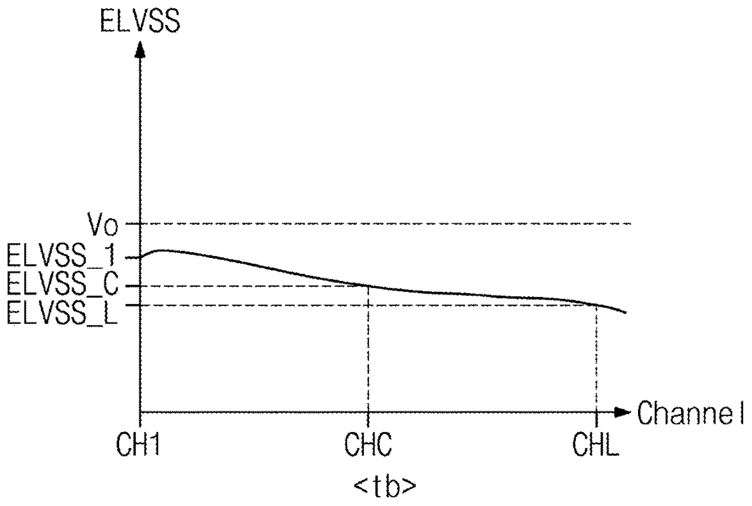
Figure 11C:
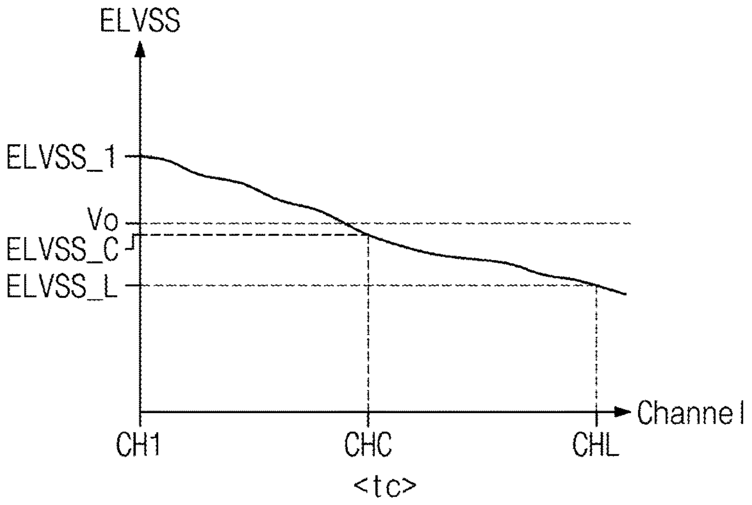
Figure 12A:
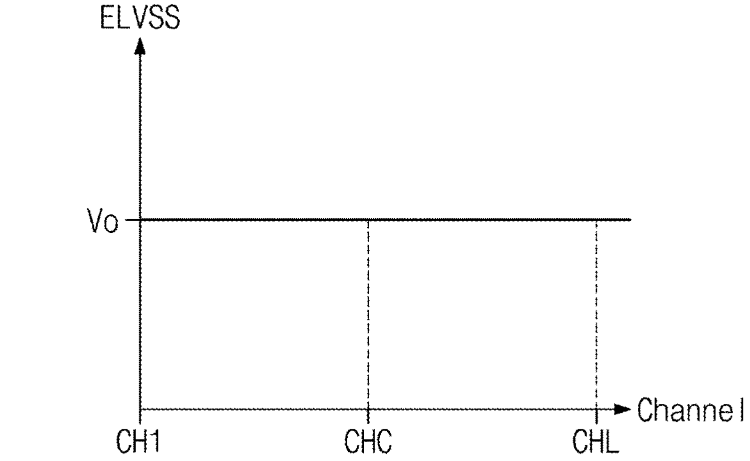
FIGS. 12A, 12B, and 12C are diagrams illustrating changes in channel-specific sub-driving voltages of a first driver chip, according to an embodiment of the present disclosure.
Figure 12B:
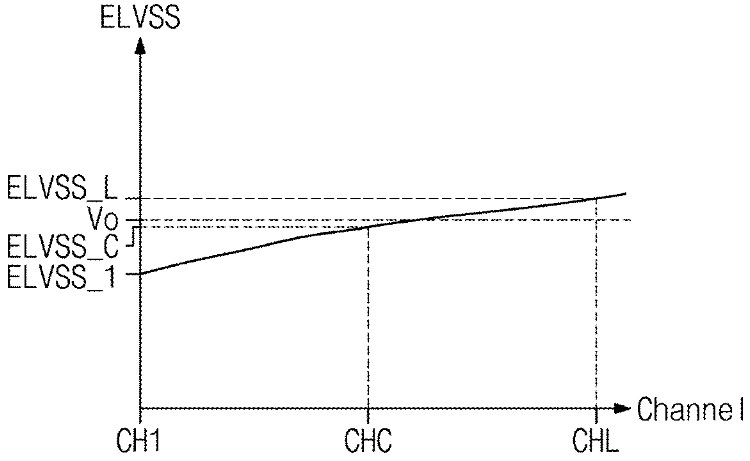
Figure 12C:
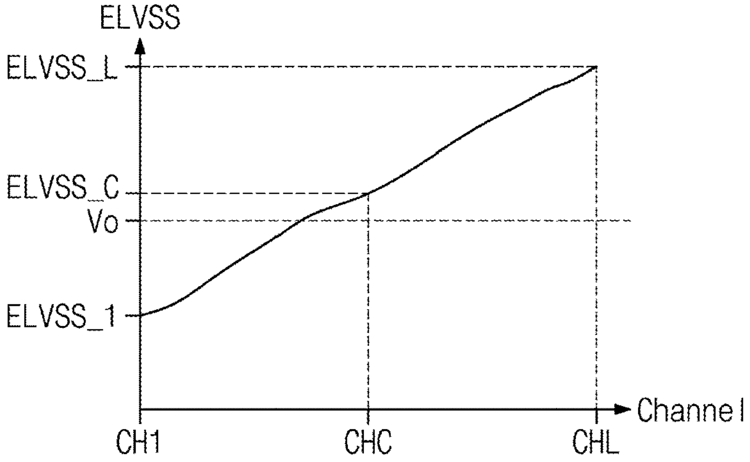

FIGS. 9A to 9C are diagrams illustrating changes in channel-specific sub-driving voltages of a first driver chip, according to an embodiment of the present disclosure. FIGS. 10A to 10C are diagrams illustrating changes in channel-specific sub-driving voltages of a first driver chip, according to an embodiment of the present disclosure. FIGS. 11A to 11C are diagrams illustrating changes in channel-specific sub-driving voltages of a first driver chip, according to an embodiment of the present disclosure. FIGS. 12A to 12C are diagrams illustrating changes in channel-specific sub-driving voltages of a first driver chip, according to an embodiment of the present disclosure.

FIGS. 9A, 10A, 11A, and 12A show sub-driving voltages respectively corresponding to the channels CH1 to CHL at the first time point ta. FIGS. 9B, 10B, 11B, and 12B show sub-driving voltages respectively corresponding to the channels CH1 to CHL at a third time point tb. FIGS. 9C, 10C, 11C, and 12C show sub-driving voltages respectively corresponding to the channels CH1 to CHL at the second time point tc.

Referring to FIGS. 9A to 9C, at the first time point ta, the sub-driving voltages may have an initial voltage level Vo. For example, the first sub-driving voltage ELVSS_1 applied to the first sub-voltage line VL1_1 (see FIG. 8A) corresponding to the first channel CH1, the center sub-driving voltage ELVSS_C applied to the center sub-voltage line VL1_C (see FIG. 8A) corresponding to the center channel CHC, and the last sub-driving voltage ELVSS_L applied to the last sub-voltage line VL1_L (see FIG. 8A) corresponding to the last channel CHL may have the initial voltage level Vo at the first time point ta.

Afterward, at the third time point tb, the first sub-driving voltage ELVSS_1, the center sub-driving voltage ELVSS_C, and the last sub-driving voltage ELVSS_L may have different voltage levels from one another. As an example of the present disclosure, the center sub-driving voltage ELVSS_C may have a lower voltage level than the first sub-driving voltage ELVSS_1 and the last sub-driving voltage ELVSS_L. Furthermore, the first sub-driving voltage ELVSS_1, the center sub-driving voltage ELVSS_C, and the last sub-driving voltage ELVSS_L may have a voltage level lower than the initial voltage level Vo. For example, during a period from the first time point ta to the third time point tb, the voltage level of each of the first sub-driving voltage ELVSS_1, the center sub-driving voltage ELVSS_C, and the last sub-driving voltage ELVSS_L may be varied such that the voltage level is lower than the initial voltage level Vo.

Afterward, at the second time point tc, the first sub-driving voltage ELVSS_1, the center sub-driving voltage ELVSS_C, and the last sub-driving voltage ELVSS_L may have different voltage levels from one another. As an example of the present disclosure, the center sub-driving voltage ELVSS_C may have a voltage level lower than the initial voltage level Vo. The first sub-driving voltage ELVSS_1 and the last sub-driving voltage ELVSS_L may have a higher voltage level than the initial voltage level Vo. For example, during a period from the third time point tb to the second time point tc, the voltage level of each of the first sub-driving voltage ELVSS_1, the center sub-driving voltage ELVSS_C, and the last sub-driving voltage ELVSS_L may be varied such that the voltage level gradually increases over time.

Referring to FIGS. 10A to 10C, at the first time point ta, the sub-driving voltages may have the initial voltage level Vo. For example, the first sub-driving voltage ELVSS_1 applied to the first sub-voltage line VL1_1 (see FIG. 8A) corresponding to the first channel CH1, the center sub-driving voltage ELVSS_C applied to the center sub-voltage line VL1_C (see FIG. 8A) corresponding to the center channel CHC, and the last sub-driving voltage ELVSS_L applied to the last sub-voltage line VL1_L (see FIG. 8A) corresponding to the last channel CHL may have the initial voltage level Vo at the first time point ta.

Afterward, at the third time point tb, the first sub-driving voltage ELVSS_1, the center sub-driving voltage ELVSS_C, and the last sub-driving voltage ELVSS_L may have different voltage levels from one another. As an example of the present disclosure, the center sub-driving voltage ELVSS_C may have a higher voltage level than the first sub-driving voltage ELVSS_1 and the last sub-driving voltage ELVSS_L. Furthermore, the first sub-driving voltage ELVSS_1, the center sub-driving voltage ELVSS_C, and the last sub-driving voltage ELVSS_L may have a voltage level lower than the initial voltage level Vo. For example, during a period from the first time point ta to the third time point tb, the voltage level of each of the first sub-driving voltage ELVSS_1, the center sub-driving voltage ELVSS_C, and the last sub-driving voltage ELVSS_L may be varied such that the voltage level is lower than the initial voltage level Vo.

Afterward, at the second time point tc, the first sub-driving voltage ELVSS_1, the center sub-driving voltage ELVSS_C, and the last sub-driving voltage ELVSS_L may have different voltage levels from one another. As an example of the present disclosure, the center sub-driving voltage ELVSS_C may have a voltage level higher than the initial voltage level Vo. The first sub-driving voltage ELVSS_1 and the last sub-driving voltage ELVSS_L may have a lower voltage level than the initial voltage level Vo. For example, during a period from the third time point tb to the second time point tc, the voltage level of each of the first sub-driving voltage ELVSS_1, the center sub-driving voltage ELVSS_C, and the last sub-driving voltage ELVSS_L may be varied such that the voltage level gradually increases over time.

Referring to FIGS. 11A to 11C, at the first time point ta, the sub-driving voltages may have the initial voltage level Vo. For example, the first sub-driving voltage ELVSS_1 applied to the first sub-voltage line VL1_1 (see FIG. 8A) corresponding to the first channel CH1, the center sub-driving voltage ELVSS_C applied to the center sub-voltage line VL1_C (see FIG. 8A) corresponding to the center channel CHC, and the last sub-driving voltage ELVSS_L applied to the last sub-voltage line VL1_L (see FIG. 8A) corresponding to the last channel CHL may have the initial voltage level Vo at the first time point ta.

Afterward, at the third time point tb, the first sub-driving voltage ELVSS_1, the center sub-driving voltage ELVSS_C, and the last sub-driving voltage ELVSS_L may have different voltage levels from one another. As an example of the present disclosure, the center sub-driving voltage ELVSS_C may have a lower voltage level than the first sub-driving voltage ELVSS_1. The last sub-driving voltage ELVSS_L may have a lower voltage level than the center sub-driving voltage ELVSS_C. Furthermore, the first sub-driving voltage ELVSS_1, the center sub-driving voltage ELVSS_C, and the last sub-driving voltage ELVSS_L may have a voltage level lower than the initial voltage level Vo.

Afterward, at the second time point tc, the first sub-driving voltage ELVSS_1, the center sub-driving voltage ELVSS_C, and the last sub-driving voltage ELVSS_L may have different voltage levels from one another. As an example of the present disclosure, the first sub-driving voltage ELVSS_1 may have a higher voltage level than the initial voltage level Vo. The center sub-driving voltage ELVSS_C and the last sub-driving voltage ELVSS_L may have a voltage level lower than the initial voltage level Vo.

Referring to FIGS. 12A to 12C, at the first time point ta, the sub-driving voltages may have the initial voltage level Vo. For example, the first sub-driving voltage ELVSS_1 applied to the first sub-voltage line VL1_1 (see FIG. 8A) corresponding to the first channel CH1, the center sub-driving voltage ELVSS_C applied to the center sub-voltage line VL1_C (see FIG. 8A) corresponding to the center channel CHC, and the last sub-driving voltage ELVSS_L applied to the last sub-voltage line VL1_L (see FIG. 8A) corresponding to the last channel CHL may have the initial voltage level Vo at the first time point ta.

Afterward, at the third time point tb, the first sub-driving voltage ELVSS_1, the center sub-driving voltage ELVSS_C, and the last sub-driving voltage ELVSS_L may have different voltage levels from one another. As an example of the present disclosure, the center sub-driving voltage ELVSS_C may have a higher voltage level than the first sub-driving voltage ELVSS_1. The last sub-driving voltage ELVSS_L may have a higher voltage level than the center sub-driving voltage ELVSS_C. The first sub-driving voltage ELVSS_1 and the center sub-driving voltage ELVSS_C may have a voltage level lower than the initial voltage level Vo. The last sub-driving voltage ELVSS_L may have a higher voltage level than the initial voltage level Vo.

Afterward, at the second time point tc, the first sub-driving voltage ELVSS_1, the center sub-driving voltage ELVSS_C, and the last sub-driving voltage ELVSS_L may have different voltage levels from one another. As an example of the present disclosure, the first sub-driving voltage ELVSS_1 may have a lower voltage level than the initial voltage level Vo. The center sub-driving voltage ELVSS_C and the last sub-driving voltage ELVSS_L may have a voltage level higher than the initial voltage level Vo.

As shown in FIGS. 9A to 12C, the first sub-driving voltage ELVSS_1, the center sub-driving voltage ELVSS_C, and the last sub-driving voltage ELVSS_L are varied different forms over time during the sensing period TP2 (see to FIG. 5B). In addition to the form shown in FIGS. 9A to 12C, variable forms of the sub-driving voltages for each of the channel CH1 to CHL may be variously modified depending on characteristics of the display device DD (see FIG. 1) or the characteristics of each of the driver chips 201 to 204.

Figure 13:
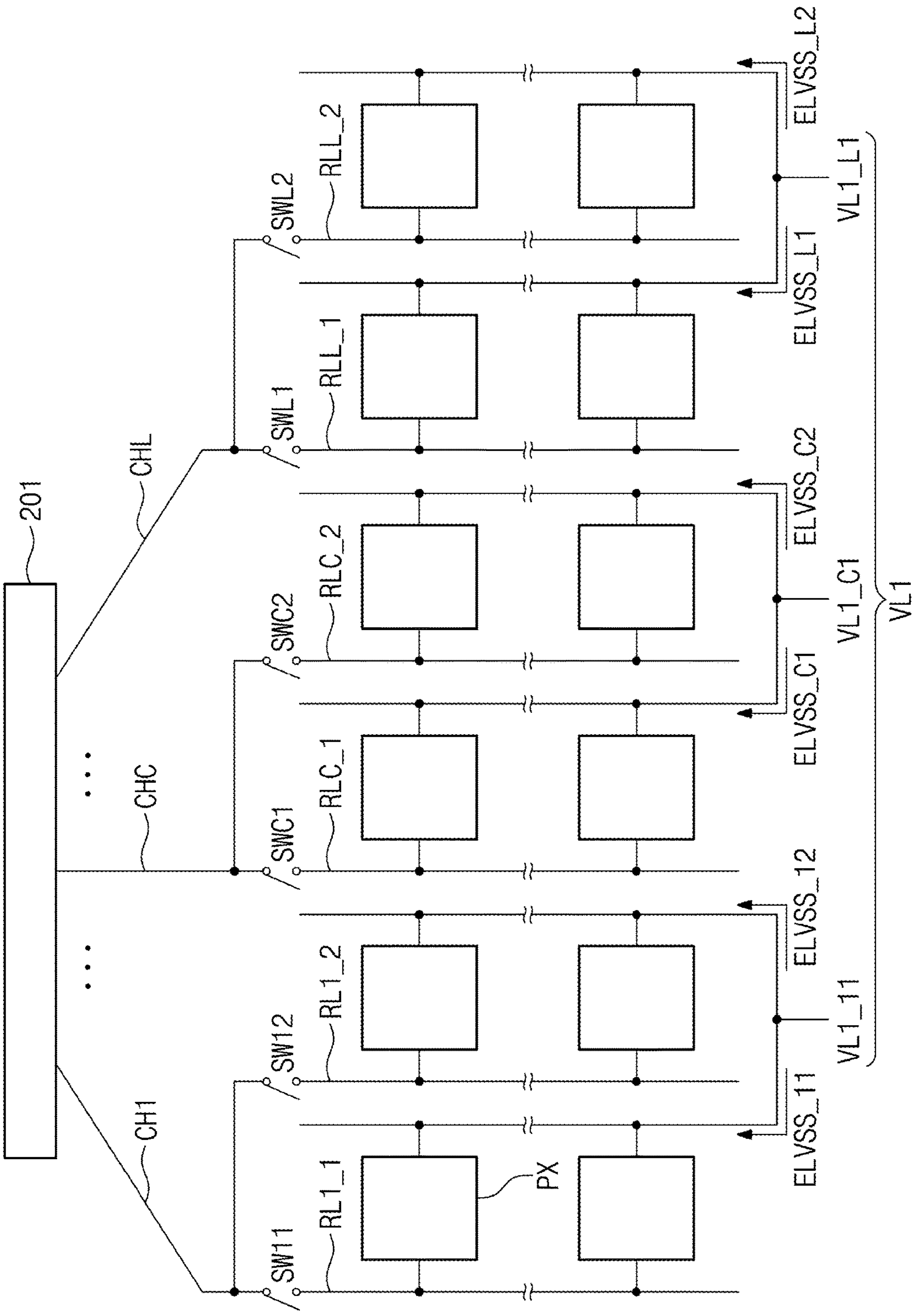
FIG. 13 is a diagram illustrating a connection relationship between a first driver chip, sensing lines, and sub-voltage lines, according to an embodiment of the present disclosure.

FIG. 13 is a diagram illustrating a connection relationship between a first driver chip, sensing lines, and sub-voltage lines, according to an embodiment of the present disclosure. However, components, which are equal to the components illustrated in FIG. 8A, from among components illustrated in FIG. 13 are marked by the same reference signs, and thus, additional description will be omitted to avoid redundancy.

Referring to FIG. 13, the first driver chip 201 includes the plurality of channels CH1 to CHL. 'k' sensing lines may be electrically connected to each of the channels CH1 to CHL. FIG. 13 shows that 'k' is 2, but the present disclosure is not limited thereto. For example, three or more sensing lines may be electrically connected to each of the channels CH1 to CHL.

The display panel DP (see FIG. 7) may further include 'k' switching elements commonly connected to each of the channels CH1 to CHL of the first driver chip 201. The 'k' switching elements may be turned on alternately with each other. FIG. 13 shows a structure in which two switching elements are connected to each of the channels CH1 to CHL. For example, the number of switching elements may be linked to the number of sensing lines connected to each of the channels CH1 to CHL. When three sensing lines are connected to each of the channels CH1 to CHL, three switching elements connected between each of the channels CH1 to CHL and the three sensing lines may be provided on the display panel DP.

As an example of the present disclosure, first and second switching elements SW11 and SW12 are connected to the first channel CH1. The third and fourth switching elements SWC1 and SWC2 are connected to the center channel CHC. The fifth and sixth switching elements SWL1 and SWL2 are connected to the last channel CHL.

Two sensing lines (hereinafter referred to as "first and second sub-sensing lines RL1_1 and RL1_2") are connected to the first channel CH1 through the first and second switching elements SW11 and SW12. Two sensing lines (hereinafter referred to as "third and fourth sub-sensing line RLC_1 and RLC_2") are connected to the center channel CHC through the third and fourth switching elements SWC1 and SWC2. Two sensing lines (hereinafter referred to as "fifth and sixth sub-sensing lines RLL_1 and RLL_2") are connected to the last channel CHL through the fifth and sixth switching elements SWL1 and SWL2.

The first, third and fifth switching elements SW11, SWC1, and SWL1 may operate simultaneously (i.e., turned on), and thus the first driver chip 201 may receive the sensing voltage Vs (see FIG. 5A) from the first, third, and fifth sub-sensing lines RL1_1, RLC_1, and RLL_1. A period in which the first, third, and fifth switching elements SW11, SWC1, and SWL1 are turned on may be referred to as a "first sub-sensing period". Afterward, when the first, third, and fifth switching elements SW11, SWC1, and SWL1 are turned off, and the second, fourth, and sixth switching elements SW12, SWC2, and SWL2 are turned on at the same time, the first driver chip 201 may receive the sensing voltage Vs from the second, fourth, and sixth sub-sensing lines RL1_2, RLC_2, and RLL_2. A period in which the second, fourth, and sixth switching elements SW12, SWC2, and SWL2 are turned on may be referred to as a "second sub-sensing period".

The first driving voltage line VL1 may include a plurality of sub-voltage lines VL1_11 to VL1_L1 positioned for each of the channels CH1 to CHL. As an example of the present disclosure, a first sub-voltage line VL1_11 is positioned to correspond to the first channel CH1, a center sub-voltage line VL1_C1 is positioned to correspond to the center channel CHC, and, a last sub-voltage line VL1_L1 is positioned to correspond to the last channel CHL.

The first sub-voltage line VL1_11 may be connected to the pixels PX connected to the first and second sub-sensing lines RL1_1 and RL1_2. The center sub-voltage line VL1_C1 may be connected to the pixels PX connected to the third and fourth sub-sensing lines RLC_1 and RLC_2. The last sub-voltage line VL1_L1 may be connected to the pixels PX connected to the fifth and sixth sub-sensing lines RLL_1 and RLL_2.

During a first sub-sensing period, a first sub-driving voltage ELVSS_11 that varies over time based on the sensing voltage Vs sensed through the first sub-sensing line RL1_1 is applied to the first sub-voltage line VL1_11. During a second sub-sensing period, a second sub-driving voltage ELVSS_12 that varies over time based on the sensing voltage Vs sensed through the second sub-sensing line RL1_2 is applied to the first sub-voltage line VL1_11.

During the first sub-sensing period, a third sub-driving voltage ELVSS_C1 that varies over time based on the sensing voltage Vs sensed through the third sub-sensing line RLC_1 is applied to the center sub-voltage line VL1_C1. During the second sub-sensing period, a fourth sub-driving voltage ELVSS_C2 that varies over time based on the sensing voltage Vs sensed through the fourth sub-sensing line RLC_2 is applied to the center sub-voltage line VL1_C1.

During the first sub-sensing period, a fifth sub-driving voltage ELVSS_L1 that varies over time based on the sensing voltage Vs sensed through the fifth sub-sensing line RLL_1 is applied to the last sub-voltage line VL1_L1. During the second sub-sensing period, a sixth sub-driving voltage ELVSS_L2 that varies over time based on the sensing voltage Vs sensed through the sixth sub-sensing line RLL_2 is applied to the last sub-voltage line VL1_L1.

As such, when the number of channels is smaller than the number of sensing lines, two or more sensing voltages Vs may be sensed in one channel through time division. Compared to a structure in which sensing lines correspond to channels one-to-one, the number of sub-voltage lines VL1_11 to VL1_L1 driven independently of each other may also be reduced.

Figure 14A:
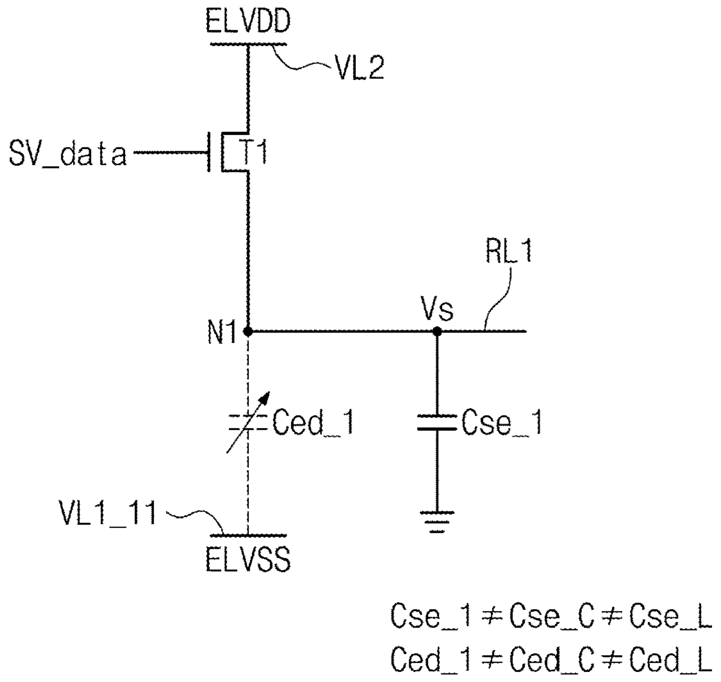
FIGS. 14A, 14B, and 14C are diagrams illustrating deviations between channel-specific line capacitances of a first driver chip, according to an embodiment of the present disclosure.
Figure 14B:
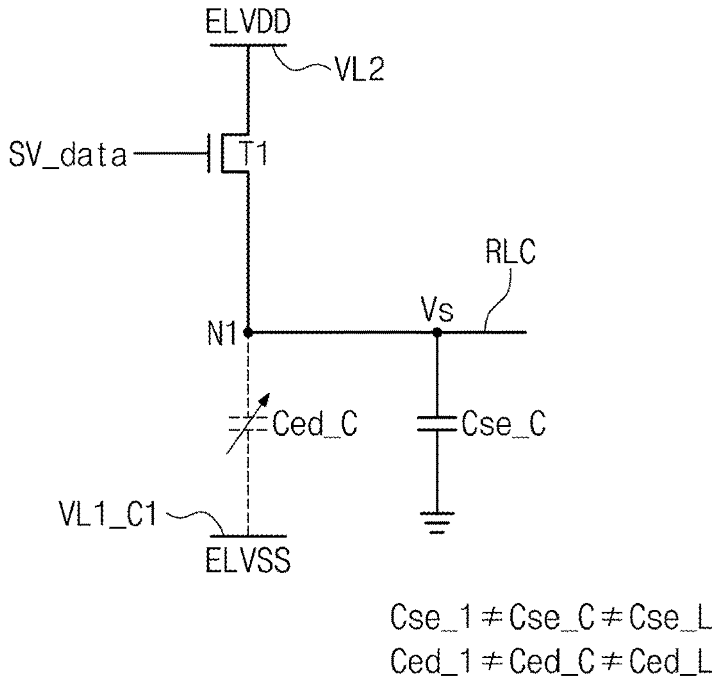
Figure 14C:
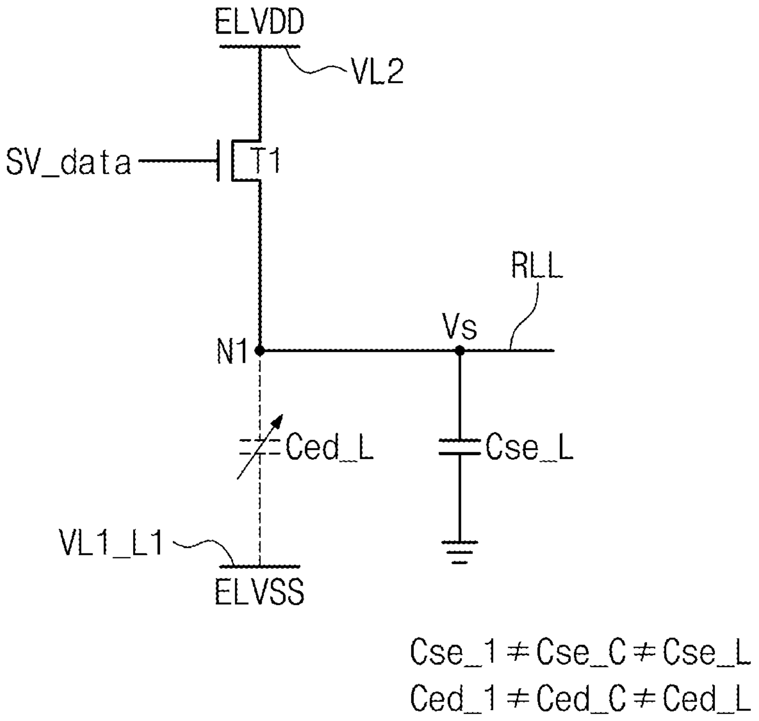

FIGS. 14A to 14C are diagrams illustrating deviation of channel-specific line capacitance of a first driver chip, according to an embodiment of the present disclosure. FIG. 14A shows a first line capacitor Cse_1 connected to a first sensing line RL1. FIG. 14B shows a center line capacitor Cse C connected to a center sensing line RLC. FIG. 14C shows a last line capacitor Cse L connected to a last sensing line RLL.

Referring to FIGS. 14A to 14C, the first line capacitor Cse_1, the center line capacitor Cse C, and the last line capacitor Cse L may have different magnitudes (i.e., capacitance) from one another. There may be a deviation between the first line capacitor Cse_1, the center line capacitor Cse C, and the last line capacitor Cse L.

When the sensing voltage Vs is sensed by applying the sensing data voltage SV data in a state where there is a deviation between the line capacitors Cse_1, Cse C, and Cse_L, the threshold voltage of the first transistor T1 may not be accurately sensed. As an example of the present disclosure, to compensate for the deviation between these line capacitors Cse_1, Cse_C, and Cse_L, magnitudes (i.e., capacitance) of the light emitting capacitors Ced_1, Ced_C, and Ced_L respectively connected to the line capacitor Cse_1, Cse_C, and Cse_L may be set differently from one another.

For example, when the magnitude of the first line capacitor Cse_1 is smaller than the magnitude of the center line capacitor Cse_C, the first sub-driving voltage ELVSS_1 and the center sub-driving voltage ELVSS_C may be varied such that the magnitude of the first light emitting capacitor Ced_1 is greater than the magnitude of the center light emitting capacitor Ced_C. When the magnitude of the last line capacitor Cse_L is smaller than the magnitude of the center line capacitor Cse_C, the last sub-driving voltage ELVSS_L and the center sub-driving voltage ELVSS_C may be varied such that the magnitude of the last light emitting capacitor Ced_L is greater than the magnitude of the center light emitting capacitor Ced_C.

Figure 15A:
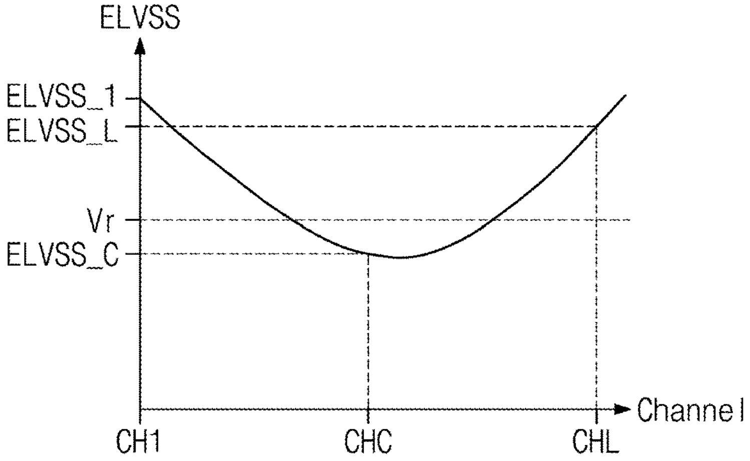
FIGS. 15A, 15B, and 15C are diagrams illustrating changes in sub-driving voltages for compensating deviations between channel-specific line capacitors of a first driver chip, according to an embodiment of the present disclosure.
Figure 15B:
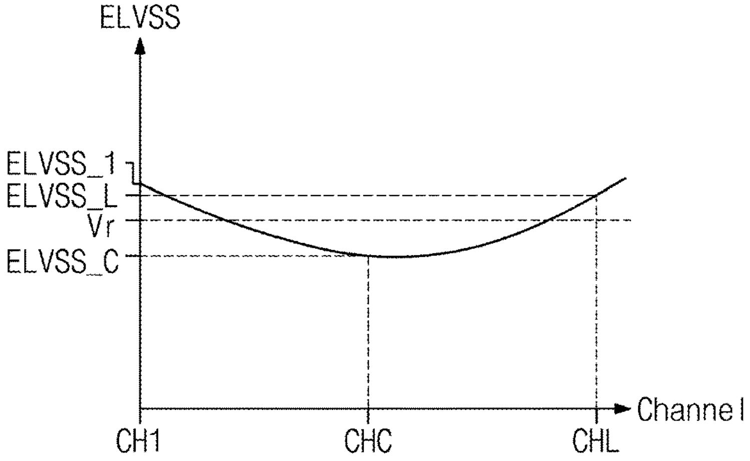
Figure 15C:
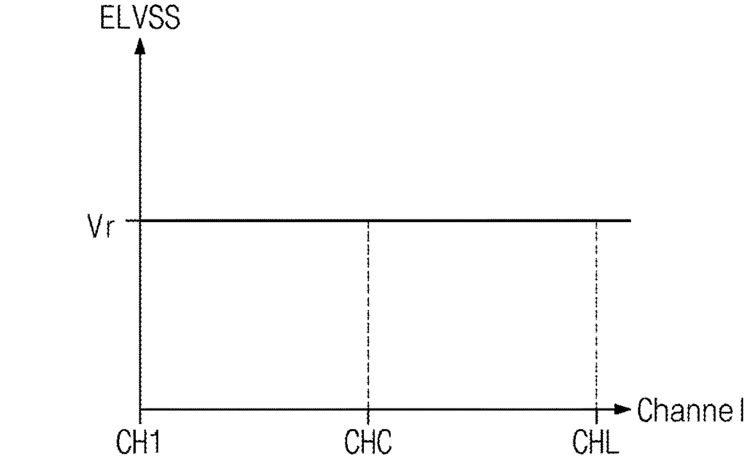
Figure 16:
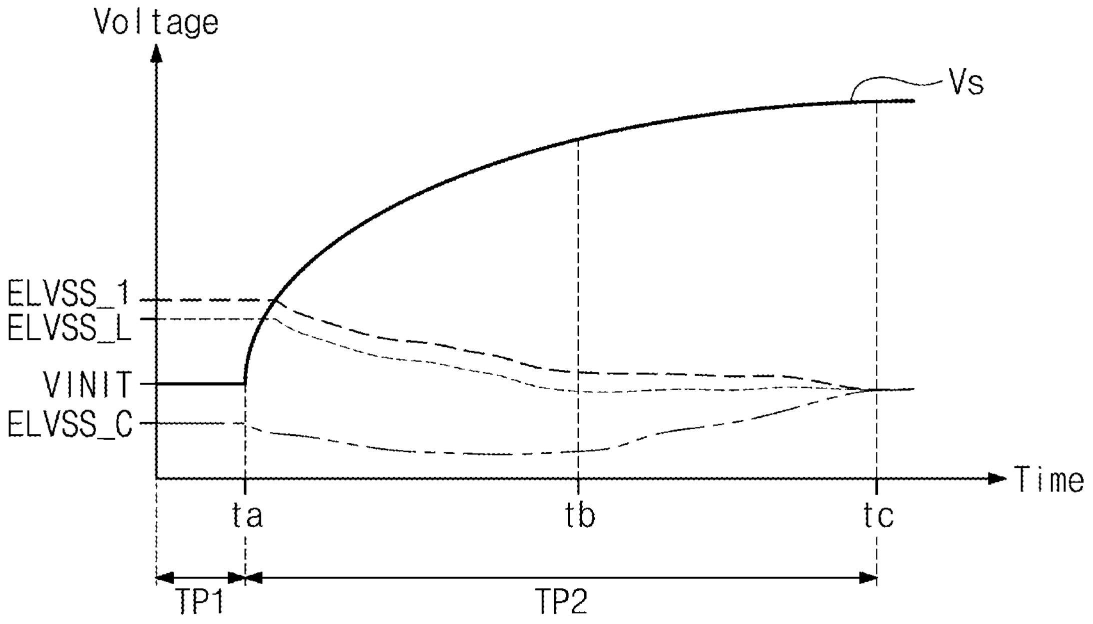
FIG. 16 is a waveform diagram showing changes in the sub-driving voltages shown in FIGS. 15A to 15C over time.

FIGS. 15A to 15C are diagrams illustrating changes in sub-driving voltages for compensating for a deviation between channel-specific line capacitors of a first driver chip, according to an embodiment of the present disclosure. FIG. 16 is a waveform diagram showing changes in sub-driving voltages shown in FIGS. 15A to 15C over time.

FIG. 15A shows sub-driving voltages respectively corresponding to the channels CH1 to CHL at the first time point ta; FIG. 15B shows sub-driving voltages respectively corresponding to the channels CH1 to CHL at the third time point tb; and, FIG. 15C shows sub-driving voltages respectively corresponding to the channels CH1 to CHL at the second time point tc.

Referring to FIGS. 15A to 15C, sub-driving voltages respectively corresponding to the channels CH1 to CHL may have different voltage levels at the first time point ta. At the first time point ta, the first sub-driving voltage ELVSS_1 applied to the first sub-voltage line VL1_1 (see FIG. 8A) corresponding to the first channel CH1, the center sub-driving voltage ELVSS_C applied to the center sub-voltage line VL1_C (see FIG. 8A) corresponding to the center channel CHC, and the last sub-driving voltage ELVSS_L applied to the last sub-voltage line VL1_L (see FIG. 8A) corresponding to the last channel CHL may have different voltage levels from one another. As an example of the present disclosure, the center sub-driving voltage ELVSS_C may have a lower voltage level than the first sub-driving voltage ELVSS_1 and the last sub-driving voltage ELVSS_L. Moreover, the center sub-driving voltage ELVSS_C may have a voltage level lower than a reference voltage level Vr. The first sub-driving voltage ELVSS_1 and the last sub-driving voltage ELVSS_L may have a higher voltage level than the reference voltage level Vr.

Afterward, at the third time point tb, the center sub-driving voltage ELVSS_C may have a voltage level lower than the reference voltage level Vr, and the first sub-driving voltage ELVSS_1 and the last sub-driving voltage ELVSS_L may have a higher voltage level than the reference voltage level Vr. However, a difference between the reference voltage level Vr and the first sub-driving voltage ELVSS_1 and a difference between the reference voltage level Vr and the last sub-driving voltage ELVSS_L at the third time point tb may be smaller than the difference at the first time point ta.

Afterward, at the second time point tc, the first sub-driving voltage ELVSS_1, the center sub-driving voltage ELVSS_C, and the last sub-driving voltage ELVSS_L may have the same voltage level as one another. As an example of the present disclosure, the first sub-driving voltage ELVSS_1, the center sub-driving voltage ELVSS_C, and the last sub-driving voltage ELVSS_L may have the reference voltage level Vr.

Referring to FIGS. 14A to 16, during the sensing period TP2, the first sub-driving voltage ELVSS_1, the center sub-driving voltage ELVSS_C, and the last sub-driving voltage ELVSS_L according to an embodiment of the present disclosure may have different voltage levels from that of the sensing voltage Vs. Accordingly, each of the light emitting capacitors Ced_1, Ced_C, and Ced_L may not have a capacitance of 0. However, the light emitting capacitors Ced_1, Ced_C, and Ced_L may have a difference in magnitude that is capable of compensating for a deviation between the line capacitors Cse_1, Cse_C, and Cse_L.

Figure 17A:
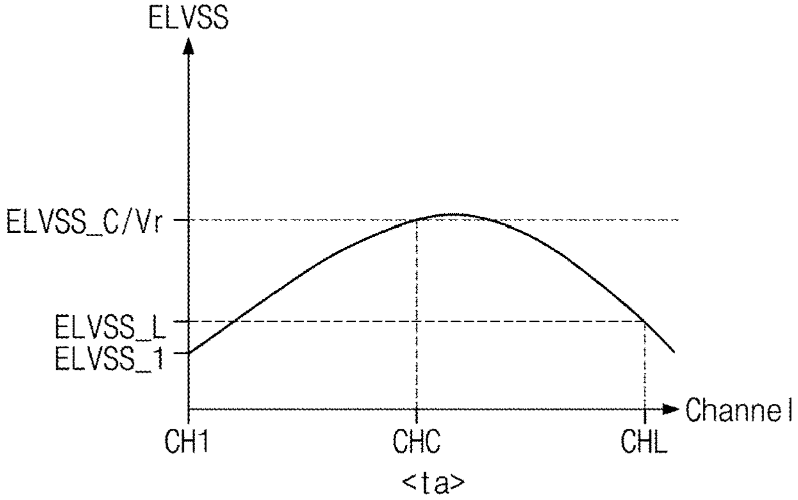
FIGS. 17A, 17B, and 17C are diagrams illustrating changes in sub-driving voltages for compensating deviations between channel-specific line capacitors of a first driver chip, according to an embodiment of the present disclosure.
Figure 17B:
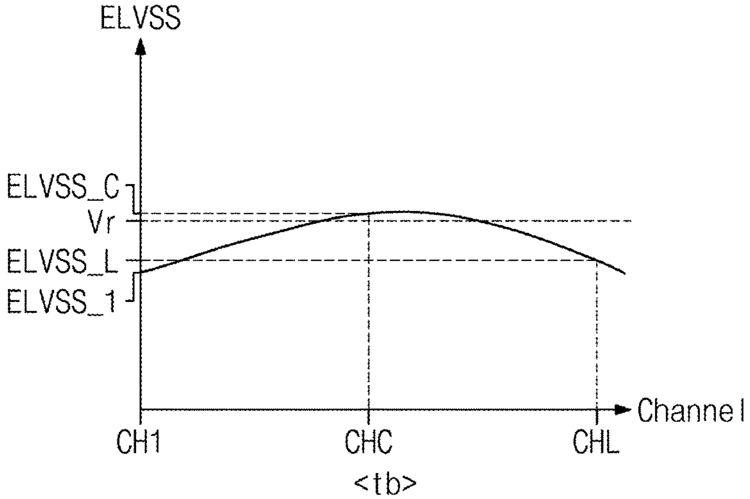
Figure 17C:
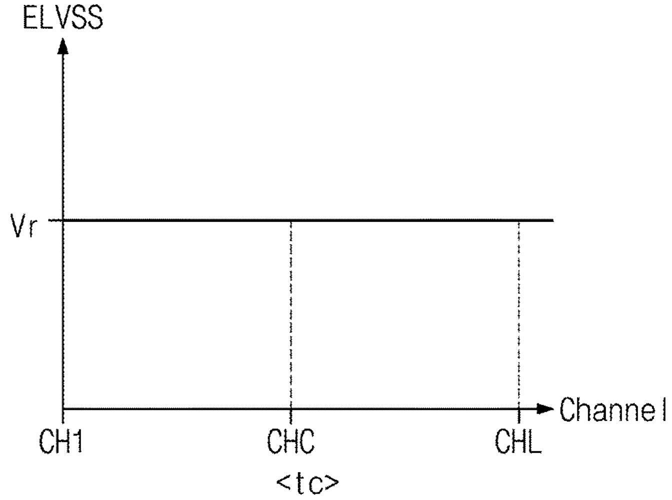
Figure 18:
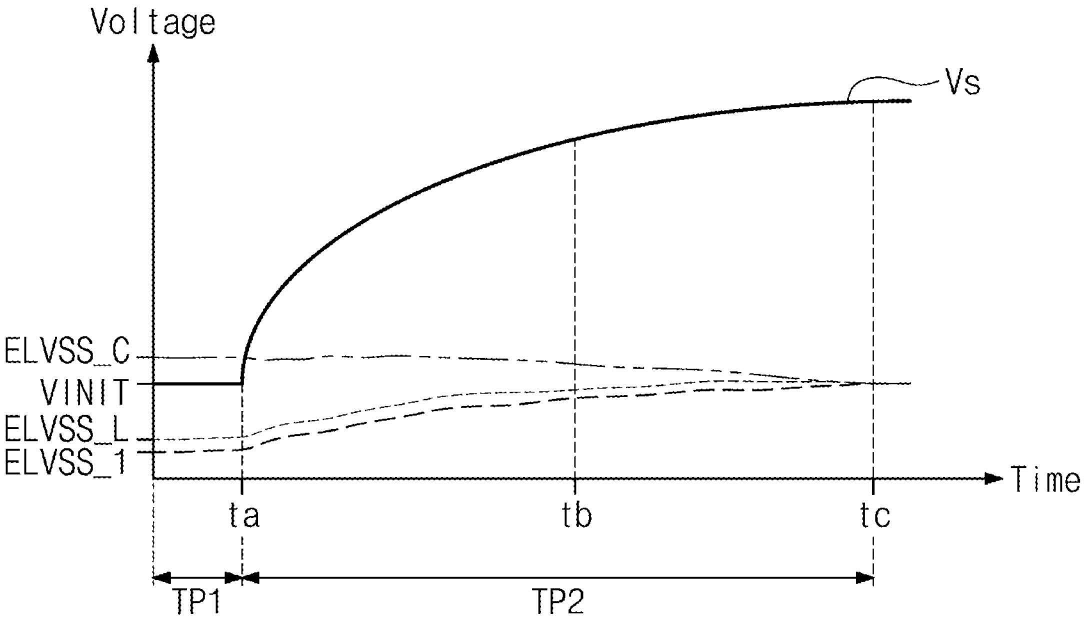
FIG. 18 is a waveform diagram showing changes in the sub-driving voltages shown in FIGS. 17A to 17C over time.

FIGS. 17A to 17C are diagrams illustrating changes in sub-driving voltages for compensating a deviation between channel-specific line capacitors of a first driver chip, according to an embodiment of the present disclosure. FIG. 18 is a waveform diagram showing changes in sub-driving voltages shown in FIGS. 17A to 17C over time.

Referring to FIGS. 17A to 17C, sub-driving voltages respectively corresponding to the channels CH1 to CHL may have different voltage levels at the first time point ta. At the first time point ta, the first sub-driving voltage ELVSS_1 applied to the first sub-voltage line VL1_1 (see FIG. 8A) corresponding to the first channel CH1, the center sub-driving voltage ELVSS_C applied to the center sub-voltage line VL1_C (see FIG. 8A) corresponding to the center channel CHC, and the last sub-driving voltage ELVSS_L applied to the last sub-voltage line VL1_L (see FIG. 8A) corresponding to the last channel CHL may have different voltage levels from one another. As an example of the present disclosure, the center sub-driving voltage ELVSS_C may have a higher voltage level than the first sub-driving voltage ELVSS_1 and the last sub-driving voltage ELVSS_L. Moreover, the center sub-driving voltage ELVSS_C may have a voltage level higher than the reference voltage level Vr. The first sub-driving voltage ELVSS_1 and the last sub-driving voltage ELVSS_L may have a voltage level lower than the reference voltage level Vr.

Afterward, at the third time point tb, the center sub-driving voltage ELVSS_C may have the voltage level higher than the reference voltage level Vr, and the first sub-driving voltage ELVSS_1 and the last sub-driving voltage ELVSS_L may have a voltage level lower than the reference voltage level Vr. However, the difference between the reference voltage level Vr and the first sub-driving voltage ELVSS_1 or the last sub-driving voltage ELVSS_L may be smaller than the difference at the first time point ta.

Afterward, at the second time point tc, the first sub-driving voltage ELVSS_1, the center sub-driving voltage ELVSS_C, and the last sub-driving voltage ELVSS_L may have the same voltage level as one another. As an example of the present disclosure, the first sub-driving voltage ELVSS_1, the center sub-driving voltage ELVSS_C, and the last sub-driving voltage ELVSS_L may have the reference voltage level Vr.

Referring to FIGS. 14A to 14C and 17A to 18, during the sensing period TP2, the first sub-driving voltage ELVSS_1, the center sub-driving voltage ELVSS_C, and the last sub-driving voltage ELVSS_L according to an embodiment of the present disclosure may have different voltage levels from that of the sensing voltage Vs. Accordingly, each of the light emitting capacitors Ced_1, Ced_C, and Ced_L may not have a capacitance of 0. However, the light emitting capacitors Ced_1, Ced_C, and Ced_L may have a difference in magnitude that is capable of compensating a deviation between the line capacitors Cse_1, Cse_C, and Cse_L.

As such, it is possible to compensate deviations between the line capacitors Cse_1, Cse_C, and Cse_L generated by the channels CH1 to CHL through the light emitting capacitors Ced_1, Ced_C, and Ced_L by differently varying voltage levels of sub-driving voltages ELVSS_1 to ELVSS_L for each of the channels CH1 to CHL. As a result, the threshold voltage of the first transistor T1 of each of the pixels PX may be accurately sensed.

Although embodiments of the present disclosure have been described for illustrative purposes, those skilled in the art will appreciate that various modifications, and substitutions are possible, without departing from the scope and spirit of the present disclosure as disclosed in the accompanying claims. Accordingly, the technical scope of the present disclosure is not limited to the detailed description of this specification, but should be defined by the claims.

According to embodiments of the present disclosure, when the driving characteristics of a pixel is sensed, a phenomenon that the sensing accuracy is reduced due to a light emitting capacitor formed by a light emitting element may be prevented or reduced by varying a first driving voltage connected to the light emitting element provided in a pixel during a sensing period over time based on a sensing voltage.

Moreover, the overall display quality of a display device may be improved by accurately sensing driving characteristics of pixels.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A display device comprising:

a display panel including a sensing line, a data line, a pixel connected to the sensing line and the data line, and a first driving voltage line connected to the pixel, wherein the pixel includes a light emitting element connected between the sensing line and the first driving voltage line;

a sensing driver configured to sense a sensing voltage through the sensing line during a sensing period; and a voltage generator configured to supply a first driving voltage to the first driving voltage line, wherein the pixel further includes:

a first transistor connected between a second driving voltage line, to which a second driving voltage is applied, and the light emitting element, wherein, during the sensing period, a gate electrode of the first transistor receives a sensing data voltage through the data line, wherein, during the sensing period, the sensing line is connected to a first node connecting the light emitting element and the first transistor and outputs a potential of the first node as the sensing voltage, wherein, during the sensing period, the voltage generator varies the first driving voltage over time based on a change in the sensing voltage, and wherein, during the sensing period, the first driving voltage is varied to have a voltage level substantially equal to the sensing voltage based on a change of the potential of the first node.

2. The display device of claim 1, wherein the sensing period is defined as a period between a first time point when the sensing data voltage is applied, and a second time point when the sensing voltage is saturated, wherein the sensing period includes a plurality of specific time points positioned between the first time point and the second time point, and wherein variation of the first driving voltage starts at the first time point and ends at the second time point.

3. The display device of claim 1, wherein the sensing driver applies an initialization voltage to the sensing line during an initialization period.

4. A display device comprising:

a display panel including a plurality of sensing lines, a plurality of data lines, a plurality of pixels connected to each of the sensing lines and each of the data lines, and a first driving voltage line connected to the plurality of pixels, wherein each of the pixels includes a light emitting element connected between a corresponding sensing line and the first driving voltage line;

at least one driver chip connected to the plurality of pixels and configured to drive the plurality of pixels and to sense sensing voltages through the plurality of sensing lines during a sensing period; and a voltage generator configured to supply a first driving voltage to the first driving voltage line, wherein each of the pixels further includes:

a first transistor connected between a second driving voltage line, to which a second driving voltage is applied, and the light emitting element, wherein, during the sensing period, a gate electrode of the first transistor receives a sensing data voltage through a corresponding data line of the data lines, wherein, during the sensing period, the corresponding sensing line is connected to a first node connecting the light emitting element and the first transistor and outputs a potential of the first node as a corresponding sensing voltage of the corresponding sensing line, wherein, during the sensing period, the voltage generator varies the first driving voltage applied to the first driving voltage line over time based on a change in the corresponding sensing voltage of the corresponding sensing line, and wherein, during the sensing period, the first driving voltage is varied to have a voltage level substantially equal to the corresponding sensing voltage based on a change of the potential of the first node.

5. The display device of claim 4, wherein the driver chip includes a plurality of channels, wherein each of the plurality of channels is connected to 'k' sensing line among the plurality of sensing lines, and wherein the 'k' is an integer that is not less than 1.

6. The display device of claim 5, wherein the first driving voltage line includes:

a plurality of sub-voltage lines, of which the number corresponds to the number of the plurality of channels and which are provided to the display panel, and wherein a plurality of sub-driving voltages are respectively applied to the plurality of sub-voltage lines.

7. The display device of claim 6, wherein the plurality of sub-driving voltages are varied in different forms over time during the sensing period.

8. The display device of claim 5, wherein the display panel further includes:

'k' switching elements commonly connected to each of the channels, and wherein the 'k' switching elements are alternately turned on with each other during the sensing period.

9. The display device of claim 4, wherein the sensing period is defined as a period between a first time point when the sensing data voltage is applied, and a second time point when the sensing voltage is saturated, and wherein the sensing period includes a plurality of specific time points positioned between the first time point and the second time point.

10. The display device of claim 4, wherein the driver chip applies an initialization voltage to the plurality of sensing lines during an initialization period.

11. The display device of claim 4, wherein the display panel further includes:

a plurality of data lines connected to the plurality of pixels, and wherein the driver chip is connected to the plurality of data lines.

12. The display device of claim 11, wherein each of the pixels includes:

a first transistor connected between a second driving voltage line, to which a second driving voltage is applied, and the light emitting element; and a second transistor connected between the first transistor and a corresponding data line among the plurality of data lines, wherein, during the sensing period, the corresponding data line provides a sensing data voltage to the second transistor, and wherein, during the sensing period, the first transistor operates in response to the sensing data voltage.

13. An electronic device comprising:

a display panel including a plurality of sensing line, a plurality of data lines, a plurality of line capacitors respectively connected to the plurality of sensing lines, a plurality of pixels connected to each of the sensing lines and each of the data lines, and a first driving voltage line connected to the plurality of pixels, wherein each of the pixels includes a light emitting element connected between a corresponding sensing line and the first driving voltage line;

at least one driver chip connected to the plurality of pixels and configured to drive the plurality of pixels and to sense sensing voltages through the plurality of sensing lines during a sensing period; and a voltage generator configured to supply a first driving voltage to the first driving voltage line, wherein the pixel further includes:

a first transistor connected between a second driving voltage line, to which a second driving voltage is applied, and the light emitting element, wherein, during the sensing period, a gate electrode of the first transistor receives a sensing data voltage through a corresponding data line of the data lines, wherein, during the sensing period, the corresponding sensing line is connected to a first node connecting the light emitting element and the first transistor and outputs a potential of the first node as a corresponding sensing voltage of the corresponding sensing line, wherein the first driving voltage line includes a plurality of sub-voltage lines provided to the display panel and isolated from one another, wherein a plurality of sub-driving voltages are respectively applied to the plurality of sub-voltage lines, wherein, during the sensing period, the voltage generator varies each of the plurality of sub-driving voltages over time based on a deviation between the plurality of line capacitors, and wherein, during the sensing period, the first driving voltage is varied to have a voltage level substantially equal to the corresponding sensing voltage based on a change of the potential of the first node.

14. The electronic device of claim 13, wherein the driver chip includes a plurality of channels, wherein each of the plurality of channels is connected to 'k' sensing line among the plurality of sensing lines, and wherein the 'k' is an integer that is not less than 1.

15. The electronic device of claim 14, wherein the plurality of sub-voltage lines have the number corresponding to the number of the plurality of channels and are provided to the display panel.

16. The electronic device of claim 15, wherein the deviation between the plurality of line capacitors is varied over time during the sensing period, and wherein, during the sensing period, the plurality of sub-driving voltages are varied in different forms in conjunction with a change in the deviation.

17. The electronic device of claim 13, wherein the driver chip is connected to the plurality of data lines.

18. The electronic device of claim 17, wherein each of the pixels further includes:

a second transistor connected between the first transistor and the corresponding data line among the plurality of data lines, wherein, during the sensing period, the corresponding data line provides the sensing data voltage to the second transistor, and wherein, during the sensing period, the first transistor operates in response to the sensing data voltage.

* * * * *